(12) United States Patent  
Rohrweck et al.

(10) Patent No.: US 9,015,827 B2  
(45) Date of Patent: *Apr. 21, 2015

(54) TRANSITIONING BETWEEN ACCESS STATES OF A COMPUTING DEVICE

(71) Applicant: Google Inc., Mountain View, CA (US)

(72) Inventors: Florian Rohrweck, Ebensee (AT); Zhen Elizabeth Fong-Jones, Somerville, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/173,623

(22) Filed: Feb. 5, 2014

(65) Prior Publication Data

US 2014/0157403 A1    Jun. 5, 2014

Related U.S. Application Data

(63) Continuation of application No. 13/652,236, filed on Oct. 15, 2012, now Pat. No. 8,694,791.

(51) Int. Cl.
*G06F 17/00* (2006.01)
*G06F 7/04* (2006.01)
*G06F 21/36* (2013.01)

(52) U.S. Cl.
CPC .................................... *G06F 21/36* (2013.01)

(58) Field of Classification Search
None
See application file for complete search history.

(56) References Cited

U.S. PATENT DOCUMENTS

| 5,559,961 | A | 9/1996 | Blonder |
|---|---|---|---|
| 7,653,931 | B1 | 1/2010 | Peterson et al. |
| 7,817,140 | B2 | 10/2010 | Fux et al. |
| 8,086,745 | B2 | 12/2011 | Liew et al. |
| 8,117,458 | B2 | 2/2012 | Osborn, III et al. |
| 8,286,103 | B2 * | 10/2012 | Chaudhri et al. ............. 715/863 |
| 8,291,350 | B1 | 10/2012 | Park et al. |
| 8,311,530 | B2 * | 11/2012 | Kornilovsky et al. ........ 455/418 |
| 8,347,103 | B2 | 1/2013 | Jones et al. |
| 2006/0206717 | A1 | 9/2006 | Holt et al. |
| 2008/0077978 | A1 | 3/2008 | Repasi et al. |
| 2008/0216169 | A1 | 9/2008 | Naizhen et al. |
| 2008/0222710 | A1 | 9/2008 | Blagsvedt et al. |

(Continued)

FOREIGN PATENT DOCUMENTS

GB            2486706 A         6/2012

OTHER PUBLICATIONS

International Search Report and Written Opinion of International Application No. PCT/US2013/060481, mailed Jan. 20, 2014, 8 pp.

*Primary Examiner* — Fikremariam A Yalew

(74) *Attorney, Agent, or Firm* — Shumaker & Sieffert, P.A.

(57) ABSTRACT

Aspects of this disclosure are directed to outputting, for display at a presence-sensitive display, a first set of two or more selectable objects in a first arrangement of locations, the computing device operating in a first instance of a limited access state. At least one of the selectable objects includes an element of a predetermined passcode. The computing device may receive an indication of a first gesture to select one of the selectable objects and an indication of a second gesture to designate the selected object as an element of a candidate passcode. The computing device may transition to an access state based at least in part on a comparison between the candidate passcode and the predetermined passcode. The computing device may transition to a second instance of the limited access state, and may output a second set of two or more selectable objects in a second, different arrangement.

18 Claims, 7 Drawing Sheets

(56) References Cited

U.S. PATENT DOCUMENTS

| | | |
|---|---|---|
| 2011/0090165 A1 | 4/2011 | Oh |
| 2011/0202981 A1 | 8/2011 | Tamai et al. |
| 2011/0321125 A1 | 12/2011 | Kyohgoku et al. |
| 2012/0192108 A1 | 7/2012 | Kolb |
| 2012/0260177 A1 | 10/2012 | Sehrer |

* cited by examiner

TRANSITIONING BETWEEN ACCESS STATES OF A COMPUTING DEVICE

This application is a Continuation of application Ser. No. 13/652,236, filed on Oct. 15, 2012, the entire content of which is hereby incorporated by reference.

BACKGROUND

Computing devices may perform various functions, such as executing applications stored at the computing device and outputting image content (e.g., documents, e-mails, and pictures) for display on a screen. Certain computing devices may include a limited access state that prevents a user from accessing applications and information stored at the computing device, thereby effectively "locking" the computing device. For example, some computing devices may enable a user to provide an input to lock the device, or may lock the device after a predetermined amount of time of inactivity of the device.

Such locking techniques may be useful to prevent unintended users from accessing applications or information stored at the computing device. For instance, the computing device may be a mobile computing device, such as a mobile phone, tablet computer, laptop computer, and the like, that may be lost or misplaced. Locking the computing device may prevent an unintended user, such as a user who happens to find the lost or misplaced computing device, from accessing information or applications stored at the computing device. As such, the locking techniques may provide a measure of security to ensure that information and applications stored at the computing device may only be accessed by users who know a passcode to unlock the computing device.

Such computing devices typically enable a user to provide the passcode to unlock the computing device and gain access to the applications or information stored at the computing device. If the user provides the correct passcode, the computing device unlocks providing access to the applications or information. Otherwise, the computing device remains in the locked state.

SUMMARY

In one example, this disclosure describes a method that includes outputting, by a computing device and for display at a presence-sensitive display operatively coupled to the computing device, a first set of two or more selectable objects in a first arrangement of locations including at least a first location of an object of the first set of the two or more selectable objects, the computing device operating in a first instance of a limited access state that denies access to one or more applications executable by the computing device. The object of the first set of the two or more selectable objects may include an element from a plurality of elements of a predetermined passcode. The method further includes receiving, by the computing device, an indication of a first gesture to select the object as a selected object, and receiving, by the computing device, an indication of a second gesture to designate the selected object as an element of a candidate passcode. The method further includes transitioning, based at least in part on a comparison between the candidate passcode and the predetermined passcode and by the computing device, the computing device from operating in the first instance of the limited access state to operating in an access state that permits access to the one or more applications executable by the computing device. The method further includes transitioning, by the computing device, the computing device from operating in the access state to operating in a second instance of the limited access state, and outputting, by the computing device and for display at the presence-sensitive display, a second set of two or more selectable objects in a second arrangement of locations, the computing device operating in the second instance of the limited access state. The first set of the two or more selectable objects and the second set of the two or more selectable objects may each include the object. The second arrangement may be different than the first arrangement such that the object is displayed at a second location that is different than the first location of the first arrangement.

In another example, this disclosure describes a computer-readable storage medium encoded with instructions that, when executed, cause at least one processor of a computing device operatively coupled to a presence-sensitive display to output for display at the presence-sensitive display, a first set of two or more selectable objects in a first arrangement of locations including at least a first location of an object of the first set of the two or more selectable objects, the computing device operating in a first instance of a limited access state that denies access to one or more applications executable by the at least one processor. The object of the first set of the two or more selectable objects may include an element from a plurality of elements of a predetermined passcode. The computer-readable storage medium is also encoded with instructions that, when executed, cause the at least one processor to receive an indication of a first gesture to select the object as a selected object, receive an indication of a second gesture to designate the selected object as an element of a candidate passcode, and transition, based at least in part on a comparison between the candidate passcode and the predetermined passcode, the computing device from operating in the first instance of the limited access state to operating in an access state that permits access to the one or more applications executable by the at least one processor. The computer-readable storage medium is also encoded with instructions that, when executed, cause the at least one processor to transition the computing device from operating in the access state to operating in a second instance of the limited access state, and output, for display at the presence-sensitive display, a second set of two or more selectable objects in a second arrangement of locations, the computing device operating in the second instance of the limited access state. The first set of the two or more selectable objects and the second set of the two or more selectable objects may each include the object. The second arrangement may be different than the first arrangement such that the object is displayed at a second location that is different than the first location of the first arrangement.

In another example, this disclosure describes a device that includes a presence-sensitive display and at least one processor operatively coupled to the presence-sensitive display. The at least one processor may be configured to output an object from two or more selectable objects for display at the presence-sensitive display, the device operating in a limited access state that denies access to one or more applications executable by the at least one processor. The object from the two or more selectable objects comprises an element from a plurality of elements of a predetermined passcode. The object from the two or more selectable objects may be output for display at different locations of the presence-sensitive display in different instances of the device operating in the limited access state. The at least one processor is further configured to receive an indication of a first gesture to select the object from the two or more selectable objects as a selected object, receive an indication of a second gesture to designate the selected object from the two or more selectable objects as an element of a candidate passcode, and transition, based at least in part on a comparison between the candidate passcode and the predetermined passcode, the device from operating in the limited access state to operating in an access state that permits access to the one or more applications executable by the at least one processor.

In another example, this disclosure describes a method that includes receiving, by a computing device operatively coupled to a presence-sensitive display, an indication of a first gesture to select an object from two or more selectable objects as a selected object, the computing device operating in a limited access state that denies access to one or more applications executable by the computing device. The computing device may not output for display any indication of locations of the two or more selectable objects at the presence-sensitive display. The object may include an element from a plurality of elements of a predetermined passcode. The method also includes providing, by the computing device and in response to receiving the indication of the first gesture to select the object from the two or more selectable objects, a haptic feedback configured to uniquely identify the selected object from the two or more selectable objects. The method also includes receiving, by the computing device, an indication of a second gesture to designate the selected object from the two or more selectable objects as an element of a candidate passcode, and transitioning, based at least in part on a comparison between the candidate passcode and the predetermined passcode and by the computing device, the computing device from operating in the limited access state to operating in an access state that permits access to the one or more applications executable by the computing device.

The details of one or more aspects of this disclosure are set forth in the accompanying drawings and the description below. Other features, objects, and advantages of the disclosure will be apparent from the description and drawings, and from the claims.

DETAILED DESCRIPTION

Figure 1A:
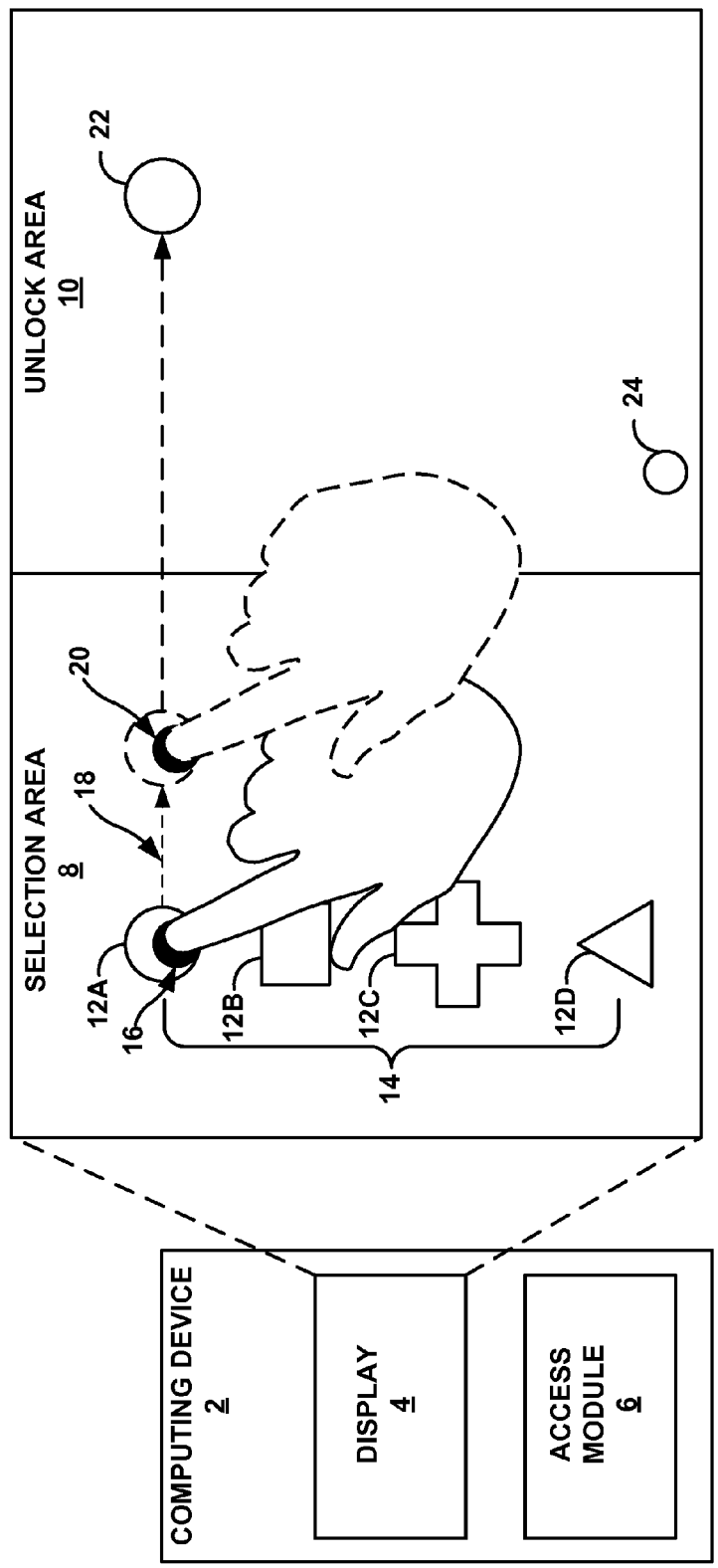
FIG. 1A is a block diagram illustrating an example computing device that may transition from a limited access state to an access state, in accordance with one or more aspects of this disclosure.

Examples described in this disclosure relate to techniques for transitioning a computing device from a limited access state (e.g., a locked state) to an access state (e.g., an unlocked state). For example, the computing device is operatively coupled to a presence-sensitive display, and it is this presence-sensitive display that detects user inputs that cause the computing device to determine whether to transition from the limited access state to the access state. In the limited access state, the computing device may deny access to one or more applications and information stored at the computing device. Based on the received user inputs, the computing device may designate one or more selectable objects displayed at the presence-sensitive display as elements of a candidate passcode. The computing device may transition from the locked state to an access state based at least in part on a comparison between the candidate passcode and the predetermined passcode.

Some other techniques may enable a user to provide a user gesture (e.g., a motion gesture) at a presence-sensitive display of the computing device to unlock the device. For instance, a user may provide the gesture (e.g., a motion gesture in a predetermined pattern) at the presence-sensitive display each time the user desires to unlock the computing device. The computing device compares the received gesture to a predetermined gesture, and may transition from the locked state to the unlocked state if the received gesture substantially matches the predetermined gesture.

However, such other techniques may create potential security issues. For instance, a user may provide the gesture with a finger, possibly leaving a visible trace of the gesture on the presence-sensitive display. Moreover, the user may repeatedly provide the same gesture (e.g., the same gesture to unlock the device every time), potentially increasing the visibility of the trace. The viewable trace may allow an unintended user to gain access to the device. For example, the unintended user may provide a user gesture that follows the visible trace to transition the device from the locked state to the unlocked state.

Techniques described herein may reduce or eliminate problems associated with visible traces on presence-sensitive displays that result from user gestures to unlock a computing device. According to various techniques of this disclosure, a computing device may output two or more selectable objects at a presence-sensitive display operatively coupled to the computing device, and may enable a user to select the objects as part of the techniques for unlocking the device.

For example, the displayed selectable objects may include, but are not limited to, shapes (e.g., circles, squares, triangles, etc.), colors, numbers, or other alphanumeric text. A passcode to transition the computing device from a limited access state (e.g., a locked state) to an access state (e.g., an unlocked state) may include a predefined sequence of the selectable objects. The user may provide one or more gestures to cause the computing device to designate the selectable objects as elements of a candidate passcode. For example, a user may provide a gesture to cause the computing device to select one of the selectable objects, and may provide a subsequent gesture to cause the computing device to designate the selected object as an element of a candidate passcode.

For instance, the user may provide a touch gesture to cause the computing device to determine which one of the selectable objects the user selected with the touch gesture, and may subsequently provide a motion gesture to fling the selected object to an area of the display designated to receive and/or display selected objects. In response to receiving the motion gesture, the computing device may designate the selected object as an element of the candidate passcode.

While described herein with respect to separate gestures (e.g., a touch gesture to select an object and a motion gesture to designate the selected object as an element of a candidate passcode), such gestures may be part of one continuous motion of an input unit with respect to the presence-sensitive display. For instance, a user may provide a touch gesture to select a selectable object and may provide a motion gesture to designate the selected object as an element of the candidate passcode as one continuous motion without lifting the input unit (e.g., a finger, stylus, and the like) from the presence-sensitive display. As one example, a user may select and designate a selectable object as an element of the candidate passcode by providing a motion gesture that begins at a location of the presence-sensitive display that displays the selectable object and includes motion toward an area of the display designated to receive and/or display selected objects. In such an example, the computing device may determine that the location of the presence-sensitive display at which the motion gesture begins represents a touch gesture to select a selectable object displayed at the location and the motion of the gesture toward the area of the display designated to receive and/or display selected objects represents a motion gesture to designate the selected object as an element of the candidate passcode.

The user may continue to provide touch and motion gestures causing the computing device to determine which objects the user selected and to designate the selected objects as elements of the candidate passcode until the user believes that he or she has designated the correct sequence of elements that corresponds to a predetermined passcode. The computing device may compare the elements of the candidate passcode with the elements of the predetermined passcode, and transition from the locked state to the unlocked state based on the determination that the candidate passcode matches the predetermined passcode.

The computing device may output for display on the presence-sensitive screen the two or more selectable objects in different (e.g., random) arrangements during each instance of the computing device being in a limited access state. For example, the computing device may output a selectable object for display at a particular location of the presence-sensitive display during an instance where the computing device is in a limited access state. Then, during a subsequent instance where the computing device is in a limited access state, the computing device may output the selectable object for display at a different (e.g., random) location at the presence-sensitive display. As such, the techniques may minimize the possibility of a visible trace occurring from multiple repetitive gestures that corresponds to the passcode. Moreover, because the locations of the selectable objects may change between instances of the computing device being in the limited access state, even if a visible trace is produced at the presence-sensitive display, the visible trace would not provide an unintended user with knowledge indicating how to unlock the computing device.

In addition, techniques described herein enable a computing device to provide haptic feedback to facilitate the user selection of the elements of the candidate passcode to transition the computing device to the access state. As one example, in response to receiving a user input to cause the computing device to determine which one of the objects the user selected, the computing device may provide a haptic feedback (e.g., one or more physical vibrations of the computing device) to indicate that the user input was received. In some examples, the haptic feedback may include a pattern of physical vibrations configured to uniquely identify the selected object. Such haptic feedback may be advantageous to visually impaired users who may otherwise have trouble causing the computing device to select the correct sequence of selectable objects to unlock the computing device. In addition, haptic feedback to uniquely identify a selected object may enable a user to cause the computing device to unlock the computing device while the computing device is physically located in a place where the presence-sensitive display is not easily viewed (e.g., a user's pocket), possibly preventing unintended users from viewing the unlock sequence. As such, in some examples, the haptic feedback may possibly provide an added measure of security.

Moreover, haptic feedback to uniquely identify a selected object may enable a user to cause the computing device to unlock the computing device without the computing device outputting for display the selectable objects. That is, rather than cause the presence-sensitive display to output graphically rendered selectable objects at the presence-sensitive display, the computing device may output two or more selectable regions at the presence-sensitive display, each of the selectable regions corresponding to one of two or more selectable objects. The computing device may not output for display any indication of the two or more selectable regions or corresponding selectable objects. In certain examples, the computing device may not output for display any indication of locations of the two or more selectable regions or corresponding selectable objects. In such examples, in response to receiving an indication of a user input to select one of the two or more selectable objects (e.g., a touch gesture received at or near a selectable region corresponding to one of the two or more selectable objects), the computing device may provide a haptic feedback configured to uniquely identify the selected object. As such, in certain examples, the haptic feedback may enable a user to recognize the selected object, and ensure that the correct objects are selected to cause the computing device to unlock the computing device without outputting for display the selectable objects at the presence-sensitive display.

FIG. 1A is a block diagram illustrating an example computing device that may transition from a limited access state to an access state, in accordance with one or more aspects of this disclosure. As illustrated in FIG. 1A, computing device 2 may include display 4 and access module 6. Examples of computing device 2 include, but are not limited to, portable or mobile devices such as cellular phones, personal digital assistants (PDAs), tablet computers, laptop computers, portable gaming devices, portable media players, e-book readers, as well as non-portable devices such as desktop computers.

Display 4 may be a liquid crystal display (LCD), e-ink, organic light emitting diode (OLED), or other display. Display 4 may present the graphical output from computing device 2 to a user. For example, display 4 may display the output of applications executed on one or more processors of computing device 2, confirmation messages, indications, or other functions that may need to be presented to a user. In some examples, display 4 may provide some or all of the functionality of a user interface of computing device 2. For instance, as in the example of FIG. 1A, display 4 may be a presence-sensitive and/or touch-sensitive display that may allow a user to interact with computing device 2.

In the example of FIG. 1A, computing device 2 is in a limited access state (e.g., a locked state) and configured to deny access to one or more applications stored at computing device 2. Access module 6, executing at one or more processors of computing device 2, may cause display 4 to output for display two or more selectable objects at selection area 8 of display 4. Selection area 8 may be an area of display 4 designated to output for display selectable objects that a user may designate as elements of a candidate passcode to transition computing device 2 from the limited access state to an access state.

As illustrated in FIG. 1A, access module 6 causes display 4 to display selectable objects 12A, 12B, 12C, and 12D (collectively referred to herein as "selectable objects 12") at selection area 8. FIG. 1A illustrates selectable objects 12 to be shapes such as a circle, square, plus sign, and triangle. Although illustrated as various shapes, selectable objects 12 are not so limited. For instance, examples of selectable objects 12 may include, but are not limited to, numbers, alphanumeric text, colors, patterns, or any combination thereof.

As an example, selectable objects 12 may include a group of colored shapes, such that each respective shape is unique within the group of shapes and each unique shape includes a color that is unique within the group of shapes. As another example, selectable objects 12 may include a combination of shapes and numbers, such that each respective selectable object within the group of selectable objects 12 is unique within the group of selectable objects 12 with respect to a combination of the shape, number, color, and pattern of the selectable object. As yet another example, selectable objects 12 may include a group of the same shape such that each respective selectable object is unique within the group of selectable objects 12 with respect to the color of the shape (e.g., a group of colored circles, each circle displayed with a color that is unique among the group of colored circles).

In general, selectable objects 12 may include any group of objects such that each object is uniquely identifiable within the group of selectable objects 12. In addition, while the group of selectable objects 12 illustrated in FIG. 1A includes four selectable objects (i.e., selectable objects 12A, 12B, 12C, and 12D), access module 6 may, in some examples, cause display 4 to output for display more than four selectable objects or less than four selectable objects at selection area 8 of display 4 (e.g., one selectable object, two selectable objects, three selectable objects, five selectable objects, or more selectable objects).

In the example of FIG. 1A, access module 6 outputs selectable objects 12 in arrangement 14. That is, arrangement 14 includes a vertically ordered sequence of selectable objects 12 such that selectable object 12A (i.e., a circular selectable object) is displayed above selectable object 12B (i.e., a square selectable object), selectable object 12B is displayed above selectable object 12C (i.e., a cross-shaped selectable object), and selectable object 12C is displayed above selectable object 12D (i.e., a triangular selectable object).

As discussed in further detail below with respect to FIGS. 4A and 4B, access module 6 may output selectable objects 12 in other arrangements, such as horizontal arrangements, circular arrangements, or other arrangements. In addition, arrangement 14 may differ during each instance of the computing device being in a limited access state, and the arrangement may be random.

As illustrated in FIG. 1A, a user may provide a gesture at display 4 (e.g., a presence-sensitive and/or touch-sensitive display). In response, computing device 2 may determine which one of selectable objects 12 the user selected with the gesture. In the example of FIG. 1A, computing device 2 determines that the user gesture included a touch gesture received at location 16 of display 4. In response, computing device 2 determines that the user selected selectable object 12A. In certain examples, computing device 2 may provide a haptic feedback, such as one or more physical vibrations of computing device 2, to indicate that computing device 2 received the touch gesture. In some examples, the haptic feedback may include a pattern of physical vibrations configured to uniquely identify the object selected by the gesture, as determined by computing device 2. For instance, computing device 2 may physically vibrate once to indicate a determination that the user selected selectable object 12A, physically vibrate twice to indicate a determination that the user selected selectable object 12B, physically vibrate in a pattern of two short vibrations followed by one long vibration to indicate a determination that the user selected selectable object 12C, etc.

In some examples, computing device 2 may output selectable regions at display 4, each of the selectable regions corresponding to one of selectable objects 12. In such examples, computing device 2 may output the selectable regions corresponding to selectable objects 12 without causing display 4 to output for display any indication of locations of selectable objects 12. In response to receiving a user gesture, computing device 2 may determine which one of selectable objects 12 the user selected (e.g., a determination of a touch gesture received at a selectable region corresponding to one of selectable objects 12). Based on the determination, computing device 2 may provide a haptic feedback, such as one or more physical vibrations of computing device 2, configured to uniquely identify the selected object, as determined by computing device 2. As such, computing device 2 may enable a user to provide a user gesture to select one of selectable objects 12 without causing display 4 to output an indication of selectable objects 12.

After receiving the touch gesture, display 4 may detect another gesture. In response to this other gesture, computing device 2 may designate the selected object as an element of a candidate passcode. For example, subsequent to receiving a first touch gesture at location 16 of display 4, which causes computing device 2 to determine that the user selected selectable object 12A with the touch gesture, display 4 may receive a second touch gesture (e.g., a double-tap gesture) at or near location 16 within a predetermined threshold time duration, a motion gesture (e.g., a horizontal swipe gesture, a vertical swipe gesture, a rotation gesture, a double-finger swipe gesture, etc.), or one or more other gestures. In response to the second touch gesture, computing device 2 may designate selectable object 12A as an element of a candidate passcode.

However, as discussed above, it should be noted that while described herein with respect to separate gestures (e.g., a touch gesture to select an object and a motion gesture to designate the selected object as an element of a candidate passcode), such gestures may be part of one continuous motion of an input unit with respect to the presence-sensitive display. For instance, a user may provide a touch gesture to select a selectable object and may provide a motion gesture to designate the selected object as an element of the candidate passcode as one continuous motion without lifting the input unit (e.g., a finger, stylus, and the like) from the presence-sensitive and/or touch sensitive display or otherwise moving the input unit away from the presence-sensitive area of a presence-sensitive display.

As illustrated in the example of FIG. 1A, display 4 receives motion gesture 18. In response to motion gesture 18, computing device 2 may designate selectable object 12A as an element of a candidate passcode. Motion gesture 18 includes a motion of an input unit (e.g., a finger, pen, stylus, and the like) from location 16 of display 4 to location 20 of display 4. As illustrated in FIG. 1A, motion gesture 18 includes a motion of a user's finger along a path from location 16 to location 20 of display 4 in a direction that is substantially from selection area 8 to unlock area 10 (e.g., a horizontal swipe gesture).

In response to receiving motion gesture 18, access module 6, executing at one or more processors of computing device 2, may cause display 4 to output an indication that computing device 2 designated selectable object 12A as an element of a candidate passcode. For example, access module 6 may cause display 4 to output for display selected object 22 (e.g., a circular selected object corresponding to selectable object 12A) at unlock area 10 of display 4. Unlock area 10 may be an area of display 4 designated to receive and/or display selected objects.

As illustrated in FIG. 1A, selection area 8 includes a region including approximately a left half of display 4 and unlock area 10 includes a region including approximately a right half of display 4. However, selection area 8 and unlock area 10 may encompass different portions of display 4 than illustrated in FIG. 1A. For example, unlock area 10 may include a region including a left half of display 4 and unlock area 10 may include a region including a right half of display 4. As another example, selection area 8 and unlock area 10 may be arranged vertically, such that selection area 8 includes a region including a top half of display 4 and unlock area 10 includes a region including a bottom half of display 4, or unlock area 10 includes a region including a top half of display 4 and selection area 8 includes a region including a bottom half of display 4. In addition, each of selection area 8 and unlock area 10 may include regions of differing size.

In some examples, in response to receiving the indication of the user input received at display 4 to cause computing device 2 to designate the selected object as an element of a candidate passcode (e.g., motion gesture 18), access module 6 may cause display 4 to output selection indicator 24 at display 4. Selection indicator 24 may be a graphical element configured to indicate that a selectable object has been designated as an element of a candidate passcode without including an indication of the designated element.

Figure 1B:
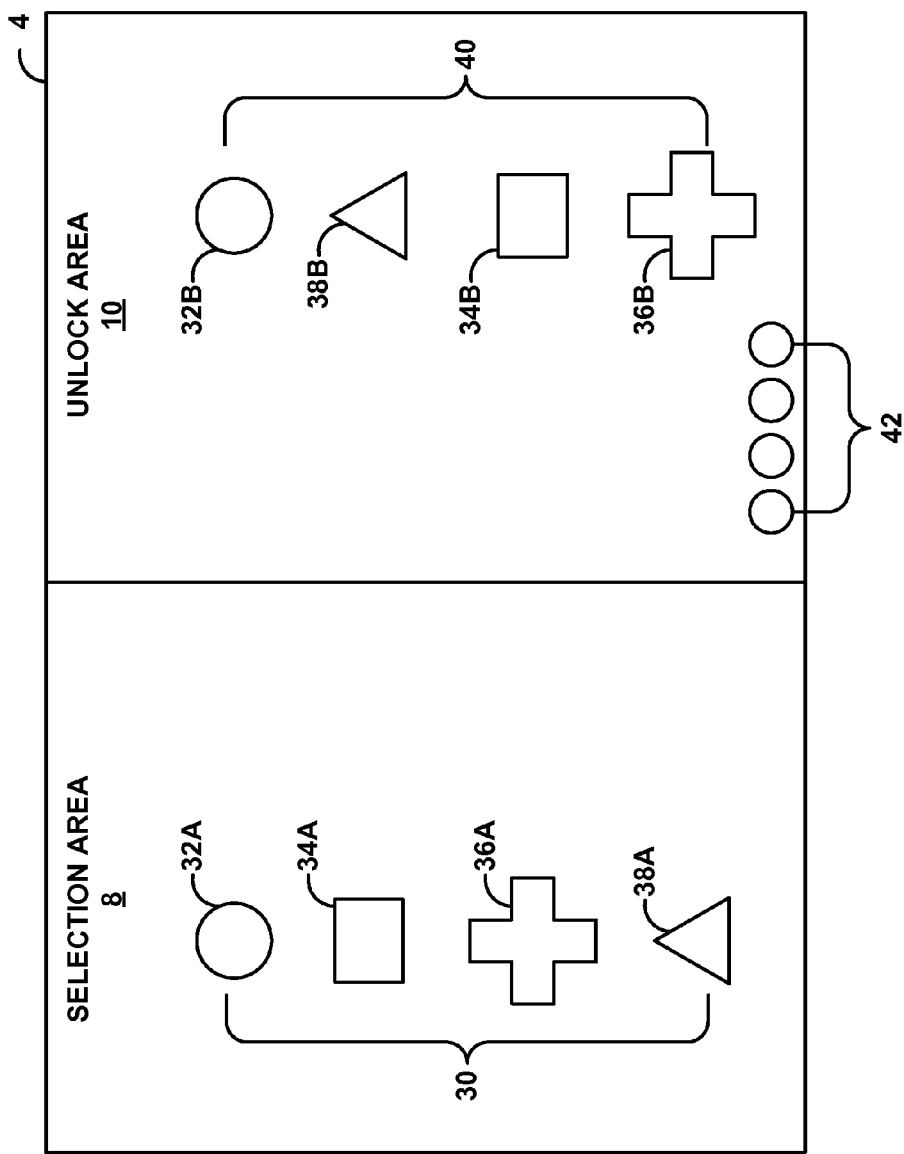
FIG. 1B is a block diagram illustrating an example of an output of a display, in accordance with one or more aspects of this disclosure.

FIG. 1B is a block diagram illustrating an example output of a display, in accordance with one or more aspects of this disclosure. As illustrated in FIG. 1B, access module 6, executing at one or more processors of computing device 2, causes display 4 to output for display selectable objects 32A, 34A, 36A, and 38A in arrangement 30 at selection area 8 of display 4. For ease of illustration, arrangement 30 and selectable objects 32A, 34A, 36A, and 38A are shown substantially similar to arrangement 14 and selectable objects 12A-12D; however, arrangement 30 and arrangement 14 may be different, and the illustrated examples of selectable objects in FIGS. 1A and 1B may be different. FIG. 1B illustrates an example of display 4 after computing device 2 received indications of user inputs to cause computing device 2 to designate each of selectable objects 32A, 34A, 36A, and 38A as an element of a candidate passcode while computing device 2 is in a limited access state (e.g., a touch gesture to cause computing device 2 to select the selectable object and a motion gesture to cause computing device 2 to designate the selectable object as an element of the candidate passcode while computing device 2 is in a limited access state). In response to receiving each indication of the user input to cause computing device 2 to designate the selectable object as an element of the candidate passcode, access module 6 causes display 4 to output for display a corresponding selected object 32B, 34B, 36B, and 38B at unlock area 10 of display 4. As illustrated in FIG. 1B, access module 6 causes display 4 to output for display selected objects 32B (e.g., corresponding to selectable object 32A), 34B (e.g., corresponding to selectable object 34A), 36B (e.g., corresponding to selectable object 36A), and 38B (e.g., corresponding to selectable object 38A) in arrangement 40 at unlock area 10 of display 4.

Arrangement 40 corresponds to the order in which selectable objects 32A, 34A, 36A, and 38A are designated as members of the candidate passcode. That is, FIG. 1B illustrates an example in which computing device 2 receives indications of user inputs to cause computing device 2 to designate selectable objects 32A, 34A, 36A, and 38A as members of the candidate passcode in the following sequence: selectable object 32A, selectable object 38A, selectable object 34A, and selectable object 36A. As such, in this example, arrangement 40 represents the candidate passcode, the elements of the candidate passcode including an ordered sequence of selected objects comprising the sequence: selected object 32B, selected object 38B, selected object 34B, and selected object 36B.

Access module 6 may cause display 4 to output for display one or more selection indicators 42 in response to receiving indications of user inputs to cause computing device 2 to designate selectable objects 32A, 34A, 36A, and 38A as elements of the candidate passcode. For instance, in the example of FIG. 1B, access module 6 causes display 4 to display a group of four individual selection indicators. Each respective selection indicator of the group of selection indicators 42 represents an indication of a designation of one of selected objects 32B, 34B, 36B, and 38B as a member of the candidate passcode. Selection indicators 42 may be graphical elements configured to indicate that a selectable object has been designated as an element of the candidate passcode without including an indication of the designated element.

For instance, as illustrated in FIG. 1B, each of selection indicators 42 may be a circular graphical element and the group of selected elements 32B, 34B, 36B, and 38B may include various shapes, such as the illustrated circular, square, cross, and triangular-shaped elements. As such, because selection indicators 42 are output for display such that the shape of a respective selection indicator does not necessarily correspond to the shape of the corresponding selected object, access module 6 may cause display 4 to display selection indicators 42 without causing display 4 to output for display an indication of the individual selected elements corresponding to the candidate passcode.

Access module 6 may cause display 4 to output for display one selection indicator of selection indicators 42 in response to receiving each indication of a user input to designate a selectable object as a member of the candidate passcode. As such, access module 6 may cause display 4 to output for display a number of selection indicators 42 at display 4 that is equal to the number of currently designated elements of the candidate passcode.

As an example, in response to receiving an indication of a user input to cause computing device 2 to designate selectable object 32A as a member of the candidate passcode, access module 6 may cause display 4 to output for display one of selection indicators 42 (e.g., one circular graphical element). Next, in response to receiving an indication of a second user input to cause computing device 2 to designate selectable object 38A as an element of the candidate passcode, access module 6 may cause display 4 to output for display a second selection indicator, such that two separate selection indicators are output at display 4 when two selectable objects are designated as elements of the candidate passcode. Access module 6 may continue to cause display 4 to output for display additional selection indicators as selectable elements are designated as members of the candidate passcode, such that the total number of selection indicators output for display equals the number of currently designated elements of the candidate passcode. In certain examples, in response to receiving user inputs to cause computing device 2 to designate selectable objects 32A, 34A, 36A, and 38A as members of the candidate passcode, access module 6 may cause display 4 to output for display selection indicators 42 without causing display 4 to output for display selected objects 32B, 34B, 36B, and 38B.

Similarly, in certain examples, access module 6 may cause display 4 to output for display selected objects 32B, 34B, 36B, and 38B without outputting selection indicators 42.

Access module 6 transitions computing device 2 from the limited access state to an access state based on a determination that the candidate passcode matches a predetermined passcode. In examples where the candidate passcode does not match the predetermined passcode, access module 6 does not transition computing device 2 from the limited access state to the access state. As such, access module 6 may deny access to applications executable at one or more processors of computing device 2 and information stored at computing device 2 until computing device 2 receives a designation of a candidate passcode that matches the predetermined passcode.

In the example of FIG. 1B, the predetermined passcode may include an ordered sequence of selected objects comprising the sequence: selected object 32B, selected object 38B, selected object 34B, and selected object 36B. In such case, because the candidate passcode corresponding to arrangement 40 matches the predetermined passcode, access module 6 may transition computing device 2 from the limited access state to the access state. In other examples, the predetermined passcode may include an ordered sequence of selected objects that is different than the candidate passcode represented by arrangement 40, such as the sequence: selected object 34B, selected object 36B, selected object 38B, and selected object 32B. In such an example, access module 6 may not transition computing device 2 from the limited access state to the access state based on a determination that the candidate passcode does not match the predetermined passcode.

In some examples, access module 6 may cause display 4 to output for display an indication of a success or failure of a candidate passcode to match a predetermined passcode. As an example, access module 6 may cause display 4 to output for display selection indicators 42 using the color red in examples where the candidate passcode does not match the predetermined passcode. Similarly, access module 4 may cause display 4 to output for display selection indicators 42 using the color green in examples where the candidate passcode matches the predetermined passcode. In examples where the candidate passcode matches the predetermined passcode, access module 6 may transition computing device 2 from the limited access state to the access state, thereby providing access to applications executable at one or more processors of computing device 2 and information stored at computing device 2.

Figure 2:
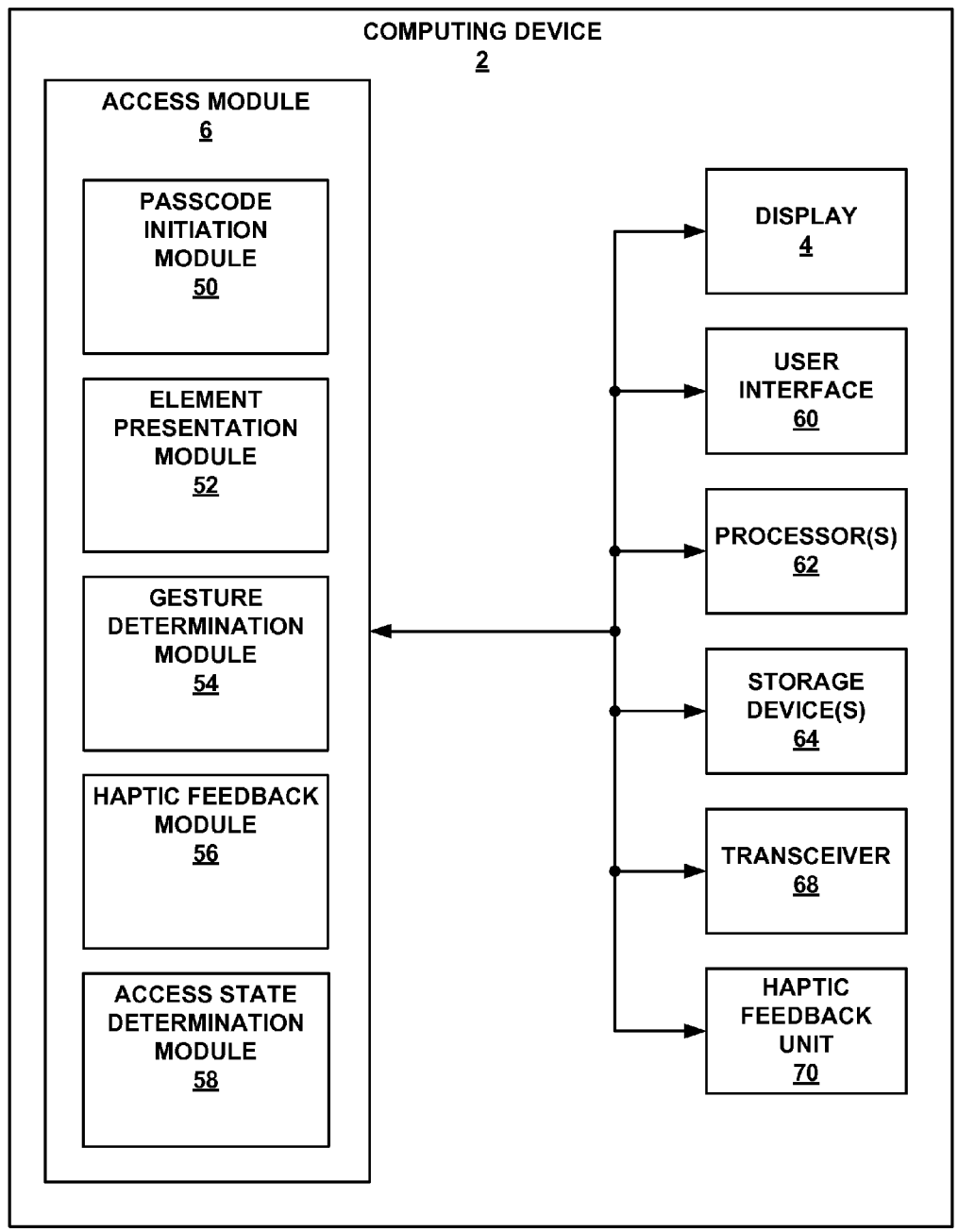
FIG. 2 is a block diagram illustrating an example computing device, in accordance with one or more aspects of this disclosure.

FIG. 2 is a block diagram illustrating an example computing device, in accordance with one or more aspects of this disclosure. As illustrated in FIG. 2, computing device 2 may include access module 6, display 4, user interface 60, one or more processors 62, one or more storage devices 64, transceiver 68, and haptic feedback unit 70. Access module 6 may include passcode initiation module 50, element presentation module 52, gesture determination module 54, haptic feedback module 56, and access state determination module 58.

In general, the modules of access module 6 are presented separately for ease of description and illustration. However, such illustration and description should not be construed to imply that these modules of access module 6 are necessarily separately implemented, but can be in some examples. For instance, one or more of the modules of access module 6 may be formed in a common hardware unit. In some instances, one or more of the modules of access module 6 may be software and/or firmware units that are executed at one or more processors 62. In this example, one or more processor 62 may execute access module 6. In yet other examples, some of the modules within access module 6 may be implemented as one or more hardware units, and the others may be implemented as software executing at one or more processors 62.

As discussed above, display 4 may present the content of computing device 2 to a user. In addition, in some examples, display 4 may provide some or all of the functionality of a user interface of computing device 2. For example, display 4 may be a presence-sensitive and/or touch-sensitive display that may allow a user to provide user gestures such as touch gestures, motion gestures, or other gestures. In certain examples, display 4 may be operatively coupled to computing device 2, but may be physically remote from computing device 2. For instance, display 4 may be a separate display that is electrically or communicatively coupled to computing device 2. As an example, computing device 2 may be a desktop computer and display 4 may be part of a tablet computer that is communicatively coupled to computing device 2, such as by a universal serial bus (USB) connection or other connection to enable communications between display 4 and computing device 2.

User interface 60 may allow a user of computing device 2 to interact with computing device 2. Examples of user interface 2 may include, but are not limited to, a keypad embedded on computing device 2, a keyboard, a mouse, a roller ball, buttons, or other devices that allow a user to interact with computing device 2. In some examples, computing device 2 may not include user interface 60, and the user may interact with computing device 2 with display 4 (e.g., by providing various user gestures). In some examples, the user may interact with computing device 2 with user interface 60 or display 4.

One or more processors 62 may include any one or more of a microprocessor, a controller, a digital signal processor (DSP), an application specific integrated circuit (ASIC), a field-programmable gate array (FPGA), or equivalent discrete or integrated logic circuitry. One or more processors 62 may be configured to implement functionality and/or process instructions for execution within computing device 2. For example, one or more processors 62 may be capable of processing instructions stored at one or more storage devices 64.

One or more storage devices 64 may include any volatile, non-volatile, magnetic, optical, or electrical media, such as a hard drive, random access memory (RAM), read-only memory (ROM), non-volatile RAM (NVRAM), electrically-erasable programmable ROM (EEPROM), flash memory, or any other digital media. One or more storage devices 64 may, in some examples, be considered as a non-transitory storage medium. In certain examples, one or more storage devices 64 may be considered as a tangible storage medium. The terms "non-transitory" and "tangible" may indicate that the storage medium is not embodied in a carrier wave or a propagated signal. However, the term "non-transitory" should not be interpreted to mean that one or more storage devices 64 is non-movable. As one example, one or more storage devices 64 may be removed from computing device 2, and moved to another device. As another example, a storage device, substantially similar to one or more storage devices 64, may be inserted into computing device 2. A non-transitory storage medium may store data that can, over time, change (e.g., in RAM).

In some examples, one or more storage devices 64 may store one or more instructions that cause one or more processors 62, access module 6, passcode initiation module 50, element presentation module 52, gesture determination module 54, haptic feedback module 56, and access state determination module 58 to perform various functions ascribed to one or more processors 62, access module 6, passcode initiation module 50, element presentation module 52, gesture determination module 54, haptic feedback module 56, and access state determination module 58. One or more storage devices 64 may be considered as a computer-readable storage media comprising instructions that cause one or more processors 62, access module 6, passcode initiation module 50, element presentation module 52, gesture determination module 54, haptic feedback module 56, and access state determination module 58 to perform various functions.

Transceiver 68 may be configured to transmit data to and receive data from one or more remote devices, such as one or more server devices remote from computing device 2, or other devices. Transceiver 68 may support wireless or wired communication, and may include appropriate hardware and software to provide wireless or wired communication. For example, transceiver 68 may include one or more of an antenna, modulators, demodulators, amplifiers, and other circuitry to effectuate communication between computing device 2 and one or more remote devices.

Haptic feedback unit 70 may be any device capable of providing haptic feedback (i.e., a feedback related to the sense of touch) to a user of computing device 2. As an example, haptic feedback unit 70 may be a vibration unit such as a motor capable of providing one or more vibrations. In such an example, vibrations provided by haptic feedback unit 70 may cause computing device 2 to vibrate in response to the vibrations provided by haptic feedback unit 70.

Computing device 2 may include additional components not shown in FIG. 2 for clarity. For example, computing device 2 may include a battery to provide power to the components of computing device 2. Similarly, the components of computing device 2 may not be necessary in every example of computing device 2. For instance, in certain examples computing device 2 may not include transceiver 68.

Figure 3:
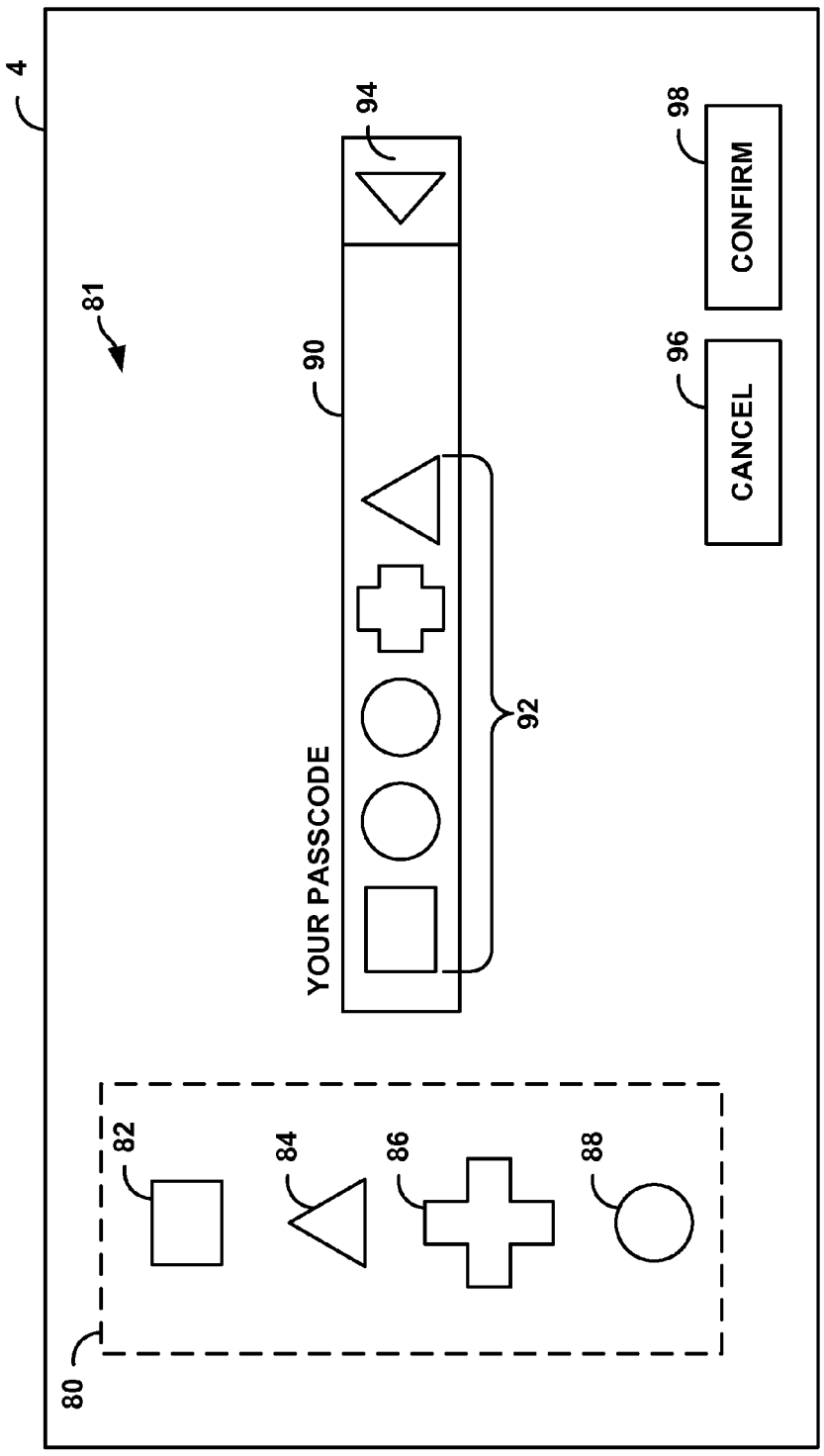
FIG. 3 is a block diagram illustrating an example output for display for configuring a passcode, in accordance with one or more aspects of this disclosure.

As described in further detail with respect to FIG. 3, passcode initiation module 50 may output a graphical user interface (GUI) at display 4 in examples where computing device 2 is in an access state (e.g., an unlocked state) to enable a user to configure a predetermined passcode that authorizes computing device 2 to transition computing device 2 from a limited access state (e.g., a locked state) to the access state. For example, passcode initiation module 50 may cause display 4 to output for display two or more selectable objects (e.g., shapes, colors, patterns, alphanumeric text, or combinations thereof) at a passcode element selection area of display 4, and may receive an indication of a user input received at display 4 (e.g., a presence-sensitive display) and/or user interface 60 to cause computing device 2 to designate one of the two or more selectable objects as an element of the predetermined passcode. Passcode initiation module 50 may receive indications of subsequent user inputs to cause computing device 2 to designate additional selectable objects as elements of the predetermined passcode. In certain examples, passcode initiation module 50 may determine the predetermined passcode as the sequence of the selected objects.

Figure 4A:
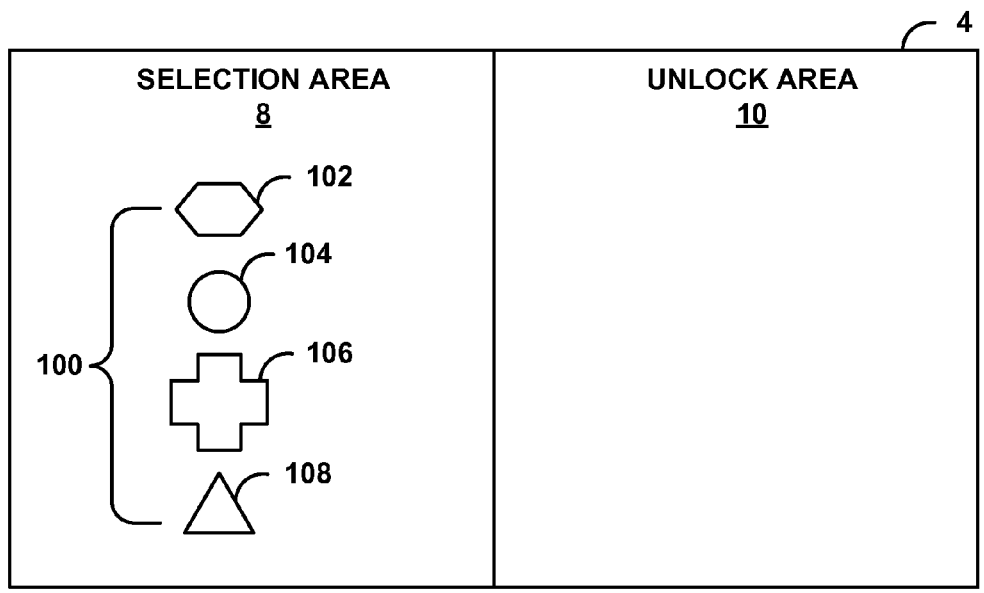
FIGS. 4A and 4B are block diagrams illustrating example outputs for display for transitioning a computing device from a limited access state to an access state, in accordance with one or more aspects of this disclosure.
Figure 4B:
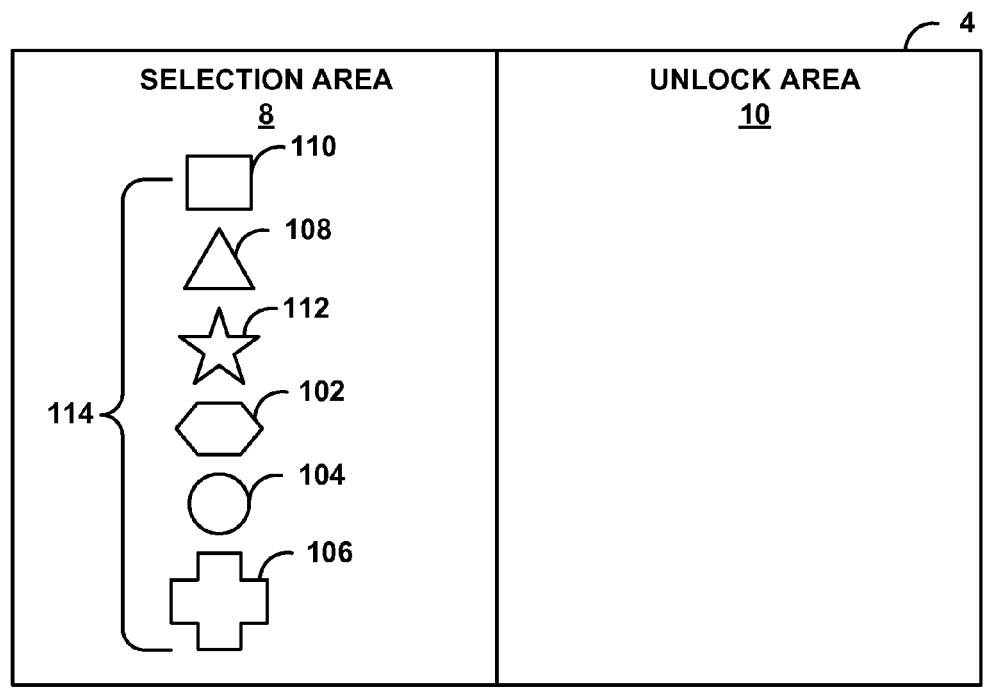

As described in further detail with respect to FIGS. 4A and 4B, element presentation module 52 may cause display 4 to display two or more selectable objects when computing device 2 is in a limited access state to enable a user to provide an input to designate at least one of the two or more selectable objects as an element of a candidate passcode. For instance, element presentation module 52 may cause display 4 to display two or more selectable elements at a selection area of display 4 (e.g., selection area 8). Computing device 2 may receive an indication of a gesture to cause computing device 2 to select one of the selectable objects (e.g., an indication of a touch gesture detected at display 4 to select one of the two or more selectable objects), and may receive an indication of a gesture to cause computing device 2 to designate the selectable object as an element of a candidate passcode (e.g., a motion gesture substantially from selection area 8 to unlock area 10 of display 4).

Element presentation module 52 may display the two or more selectable objects in different (e.g., random) arrangements during each instance of the computing device being in a limited access state. As an example, element presentation module 52 may cause display 4 to output for display the two or more selectable objects in a first arrangement at selection area 8 of display 4 during a first instance where the computing device is in a limited access state. During the first instance where the computing device is in the limited access state, a user may provide user inputs to cause computing device 2 to designate selectable objects in a sequence that matches a sequence of elements of the predetermined passcode. Computing device 2 may transition to an access state based on a determination that the candidate passcode defined by the sequence of selectable objects designated by the user matches the predetermined passcode.

Subsequent to transitioning from the first instance of the limited access state to the access state, computing device 2 may transition from the access state to a second instance of the limited access state. For example, computing device 2 may receive an indication of a user input instructing computing device 2 to transition to the limited access state. As another example, computing device 2 may transition to the second instance of the limited access state based on a determination that no user input has been received by computing device 2 for a threshold amount of time (e.g., thirty seconds, one minute, five minutes, or other threshold amounts of time).

During the second instance where computing device 2 is in the limited access state, element presentation module 52 may cause display 4 to output for display the two or more selectable objects in a second arrangement at selection area 8 of display 4. The second arrangement may be different than the first arrangement. For example, at least one of the two or more selectable objects may be displayed in both the first arrangement and the second arrangement. The at least one selectable object displayed in both arrangements may be outputted for display at a first location of display 4 in the first arrangement, and outputted for display at a second location of display 4 in the second arrangement such that the first location of display 4 is different than the second location of display 4. Because element presentation module 52 may cause display 4 to output for display the selectable objects at different locations of display 4 during separate instances where computing device 2 is in the limited access state, element presentation module 52 may help to minimize the possibility of a visible trace at display 4 occurring from multiple repetitive gestures that correspond to the predetermined passcode. As such, element presentation module 52 may help to reduce or eliminate the possibility that an unintended user may gain access to applications and/or information stored at computing device 2 by providing a gesture that follows a visible trace to transition the device from the limited access state to the access state.

Gesture determination module 54 may receive one or more indications of user inputs received at display 4 (e.g., a presence-sensitive display). Gesture determination module 54 may determine that the one or more received indications include a gesture to cause computing device 2 to select one of the two or more selectable objects output at display 4. As an example, gesture determination module 54 may determine that an indication of a user input includes an indication of a touch gesture at a region of display 4 that displays one of the selectable objects. Gesture determination module 54 may determine a region of a touch point of an input unit that is in contact with display 4 (e.g., a region of pixels of display 4 that are in contact with the input unit), and may determine that a touch gesture has been received to cause computing device 2 to select one of the selectable objects when the region of the touch point of the input unit corresponds to a region of display 4 that displays the selectable object (e.g., a region of pixels of display 4 that display the selectable object).

For instance, gesture determination module 54 may determine that a touch gesture has been received to cause computing device 2 to select the selectable object when the overlapping region (i.e., the region of pixels of display 4 that both displays the selectable object and is in contact with the input unit) is greater than a threshold amount, such as a threshold number of total pixels in the overlapping region (e.g., ten pixels, fifty pixels, one hundred pixels, or more pixels). The threshold number of pixels may, in certain examples, be a configurable number of pixels (e.g., user configurable using user interface 60).

In some examples, gesture determination module 54 may determine a centroid of the region of the touch point. In such examples, gesture determination module 54 may determine that a touch gesture has been received to cause computing device 2 to select the selectable object when the centroid of the region of the touch point corresponds to a pixel of display 4 that displays the selectable object. In other examples, gesture determination module 54 may determine that a touch gesture has been received to cause computing device 2 to select the selectable object when the centroid of the region of the touch point is within a threshold distance of a centroid of a region of display 4 that outputs for display the selectable objects (e.g., within a threshold number of pixels, such as five pixels, ten pixels, fifty pixels, or different numbers of pixels).

Gesture determination module 54 may determine that one or more received indications include a gesture to cause computing device 2 to designate one of the two or more selectable objects as an element of a candidate passcode. For example, subsequent to receiving the indication of the user input to cause computing device 2 to select one of the selectable objects (e.g., a touch gesture to select the selectable object), gesture determination module 54 may receive an indication of another user input to cause computing device 2 to designate the selectable object as an element of the candidate passcode. For instance, gesture determination module 54 may receive an indication of a motion gesture received at display 4 that includes a motion of an input unit (e.g., a finger, pen, stylus, etc.) from a first location of display 4 (e.g., the location of the touch point of the received touch gesture) to a second location of display 4 to cause computing device 2 to designate the selectable object as an element of the candidate passcode.

As an example, access module 6 may cause display 4 to output for display two or more selectable objects at a region of display 4 designated to output for display selectable objects (e.g., selection area 8). In addition, access module 6 may designate a region of display 4 as a region to receive and/or output for display selected objects. For instance, access module 6 may cause display 4 to output for display selectable objects at a left region of display 4, and may designate a right region of display 4 as a region to receive and/or output for display selected objects (e.g., unlock area 10). Gesture determination module 54 may receive an indication of a touch gesture to cause computing device 2 to select one of the selectable objects outputted for display at the selection area of a display 4. In this example, subsequent to receiving the touch gesture to cause computing device 2 to select the selectable object, gesture determination module 54 may receive a horizontal swipe gesture in a direction substantially from the selection area to the unlock area to cause computing device 2 to designate the selected object as an element of a candidate passcode.

That is, in this example, gesture determination module 54 may determine that the horizontal swipe gesture includes both horizontal and vertical components. Gesture determination module 54 may determine that a horizontal swipe gesture is provided in a direction substantially from the selection area to the unlock area in instances where the magnitude of the horizontal component of the swipe gesture from the first location to the second location is greater than the magnitude of the vertical component of the swipe gesture (e.g., the vertical component in this example including a component of the swipe gesture from a bottom region to a top region of display 4 or from a top region to a bottom region of display 4).

The example described above is provided for purposes of discussion only, and the techniques of this disclosure are not limited to the above example. For instance, gesture determination module 54 may determine that other gestures may be received to cause computing device 2 to designate a selected object as an element of a candidate passcode. For instance, in certain examples, a user may provide a rotation gesture, a two-finger swipe gesture, or one or more other gestures to cause computing device 2 to designate a selected object as an element of a candidate passcode. Similarly, in some examples, access module 6 may designate a different arrangement of a selection area and an unlock area with respect to display 4. For instance, access module 6 may cause display 4 to display two or more selectable objects at a top region of display 4 and may designate a bottom region of display 4 as a region to receive and/or display selected objects. In such an example, gesture determination module 54 may determine that a gesture has been received to cause computing device 2 to designate a selected object as an element of a candidate passcode in instances where a vertical swipe gesture has been received from a first location at the selection area to a second location such that a vertical component of the swipe gesture is greater in magnitude than a horizontal component of the swipe gesture.

In certain examples, gesture determination module 54 may determine the horizontal and vertical components of a received swipe gesture, and may cause display 4 to animate a movement of the designated object from the selection area to the unlock area according to the vertical and horizontal components of the received gesture. For instance, a received horizontal swipe gesture may include both horizontal and vertical components. In such an example, gesture determination module 54 may cause display 4 to display the selected object in an animated manner to simulate a movement of the selected object from the selection area to the unlock area according to the components of the swipe gesture. That is, gesture determination module 54 may cause display 4 to display a movement of the selected object as an animation of the selected object from the selection area to the unlock area, the path of the movement following a vector defined by the horizontal and vertical components of the received swipe gesture.

In certain examples, gesture determination module 54 may cause display 4 to display the animated movement of the selected object with respect to the boundaries of display 4. For example, a path of the movement of the selected object may appear to "bounce off" an edge of display 4 when a path following the vector defined by the horizontal and vertical components intersects a boundary of display 4 between the selection area and the unlock area.

As an example, access module 6 may cause display 4 to display two or more selectable objects at a selection area at a left region of display 4. In addition, access module 6 may designate a right region of display 4 as an unlock region to receive and/or display selected objects. A user may provide a horizontal swipe gesture substantially from the selection area at the left region of display 4 to the unlock region at the right region of display 4. The horizontal swipe gesture may include both a horizontal component and a vertical component such that the horizontal component is greater in magnitude (e.g., includes a greater number of pixels) than the vertical component. For instance, while the horizontal component may include a motion from the left region to the right region of display 4, the vertical component of the horizontal swipe gesture may include a motion from a bottom region to a top region of display 4.

In such an example, gesture determination module 54 may cause display 4 to display a movement of the selected object in a path that follows a vector defined by the horizontal and vertical components of the received horizontal swipe gesture. Because, in this example, the horizontal component of the horizontal swipe gesture is greater in magnitude than the vertical component, the path following the vector defined by the horizontal and vertical components moves from the left region of display 4 (i.e., the selection area in this example) to the right region of display 4 (i.e., the unlock area in this example).

However, the vertical component may be of such magnitude that the path following the vector intersects a top boundary of display 4 (e.g., a top edge of display 4) prior to intersecting the unlock region of display 4. In such an example, gesture determination module 54 may cause display 4 to display an animated motion of the movement of the selected object such that the motion follows a path that intersects the top boundary of display 4 and reflects off the top boundary of display 4 such that after the path of the animated motion intersects the boundary of display 4 (e.g., bounces of the boundary of display 4), the path follows a vector defined by the horizontal component of the received horizontal swipe gesture and an inverse of the vertical component of the received swipe gesture.

In certain examples, gesture determination module 54 may determine that an indication of a double-tap gesture has been received at display 4 to cause computing device 2 to designate one of the two or more selectable objects as an element of a candidate passcode. A double-tap gesture may be a gesture that includes a touch gesture received at a first location of display 4 that outputs for display one of the selectable objects to select the selectable object followed by a subsequent touch gesture received at a second location of display 4 that is at or near the first location, the subsequent touch gesture received within a threshold amount of time from the time when the first touch gesture is received.

For instance, gesture determination module 54 may receive a first indication of a first touch gesture received at a first time at a first location of display 4 that outputs for display one of the selectable objects. Subsequent to receiving the first indication of the first touch gesture, gesture determination module 54 may receive a second indication of a second touch gesture received at a second time at a second location of display 4. In some examples, gesture determination module 54 may determine that the second location of the second touch gesture is at or near the first location of the first touch gesture when the second location is within a threshold distance of the first location. For instance, gesture determination module 54 may determine a region of the touch point of the first touch gesture (i.e., the first touch point) and a centroid of the first touch point (i.e., the first centroid). Similarly, gesture determination module 54 may determine a region of the second touch point of the second touch gesture (i.e., the second touch point) and a centroid of the second touch point (i.e., the second centroid).

Gesture determination module 54 may determine that the second location of the second touch gesture is at or near the first location of the first touch gesture when the second centroid is within a threshold distance from the first centroid. The threshold distance may be a threshold number of pixels of display 4 (e.g., one hundred pixels, fifty pixels, or other numbers of pixels). In certain examples, the threshold distance may be a threshold number of pixels corresponding to a physical distance (e.g., a number of pixels corresponding to three millimeters, two millimeters, or other numbers of millimeters).

In some examples, gesture determination module 54 may determine that the second location of the second touch gesture is at or near the first location of the first touch gesture when the second centroid is within the region defined by the first touch point. In certain examples, gesture determination module 54 may determine that the second location of the second touch gesture is at or near the first location of the first touch gesture when the region defined by the second touch point overlaps the region defined by the first touch point by a threshold number of overlapping pixels (e.g., one hundred pixels, fifty pixels, or other numbers of pixels that are common to both the first touch point and the second touch point). One or more of the threshold distance, physical distance, or number of overlapping pixels may, in certain examples, be user configurable.

Gesture determination module 54 may determine that an indication of a double-tap gesture has been received at display 4 to cause computing device 2 to designate one of the two or more selectable objects as an element of a candidate passcode when the second time at which the second touch gesture is received is within a threshold time of the first time at which the first touch gesture is received. For instance, the threshold time may be two three hundred milliseconds, one hundred and fifty milliseconds, or other numbers of milliseconds. The threshold time may be, in some examples, user configurable, such as by using one or more of user interface 60 and display 4.

In certain examples, as when display 4 includes a presence-sensitive display, a user input such as a touch gesture, motion gesture, etc. may be received when a user brings an input unit such as a finger, a stylus, a pen, and the like, within proximity of display 4 that is sufficiently close to enable display 4 to detect the presence of the input unit. As such, an indication of a gesture, such as a touch gesture to select a selectable object output at display 4 and/or motion gesture to designate the selected object as an element of a candidate passcode, may be received by computing device 2 without actual physical contact between an input unit and display 4.

Haptic feedback module 56 may cause haptic feedback unit 70 to provide haptic feedback to a user (e.g., a feedback related to the sense of touch of the user) to facilitate the user selection of the candidate passcode. For example, in response to receiving an indication of a user input to cause computing device 2 to select one of the two or more selectable objects output at display 4, haptic feedback module 56 may cause haptic feedback unit 70 to provide a haptic feedback (e.g., one or more vibrations) to indicate that computing device 2 received the indication of the user input to select the selectable object.

In certain examples, haptic feedback module 56 may cause haptic feedback unit 70 to provide a haptic feedback (e.g., one or more vibrations) that is configured to uniquely identify the selected object. For instance, haptic feedback module 56 may store a group of vibrational patterns at one or more storage devices 64. Haptic feedback module 56 may associate a unique vibrational pattern with each unique selectable object output at display 4. That is, haptic feedback module 56 may associate a unique vibrational pattern with a unique selectable object such that each respective selectable object of the group of selectable objects is associated only one vibrational pattern, and each respective vibrational pattern of the group of vibrational patterns is associated with only one selectable object. As such, haptic feedback module 56 may associate a vibrational pattern with a selectable object, the vibrational pattern uniquely identifying the associated selectable object.

In response to receiving an indication of a user input to cause computing device 2 to select one of the two or more selectable objects, haptic feedback module 56 may cause haptic feedback unit 70 to output a haptic feedback (e.g., one or more vibrations) according to the vibrational pattern associated with the selected object. For instance, haptic feedback module 56 may cause haptic feedback unit 70 to physically vibrate once to indicate a received selection of a square-shaped selectable object, physically vibrate twice to indicate a received selection of a circular-shaped selectable object, physically vibrate in a pattern of two short vibrations followed by one long vibration to indicate a received selection of a cross-shaped selectable object, and the like. Other patterns to uniquely identify the selectable object may be provided, and the techniques of this disclosure are not limited to the above example.

In certain examples, the respective vibrational pattern to uniquely identify each selectable object may be user configurable. For instance, a user may configure haptic feedback module 56 to associate a particular selectable object with a particular vibrational pattern, such as by using user interface 60. The user may configure the association of vibrational patterns with respective selectable objects during a passcode initiation stage, or at any time when the computing device is in the access state.

Access state determination module 58 may determine a current access state of computing device 2. For example, access state determination module 58 may provide a limited access state, the limited access state configured to deny access to one or more applications executable on one or more processors 62 and information stored at one or more storage devices 64 of computing device 2. In addition, access state determination module 58 may provide an access state, the access state configured to provide access to the one or more applications or information stored at one or more storage devices 64.

Access state determination module 58 may determine the access state of computing device 2 (e.g., the limited access state or the access state) based on a comparison of a candidate passcode entered by a user and a predetermined passcode (e.g., a predetermined passcode stored at one or more storage devices 64). According to the techniques of this disclosure, a user may designate one or more selectable objects as elements of a candidate passcode while computing device 2 is in the limited access state. Access state determination module 58 may determine the candidate passcode as the sequence of selectable objects designated by the user. Access state determination module 58 may determine the predetermined passcode as a sequence of selectable objects designated by the user in a passcode initiation stage, or as a pre-defined sequence of selectable objects stored at one or more storage devices 64 (e.g., an out-of-the-box initial passcode).

Access state determination module 58 may compare the sequence of selected elements of the candidate passcode to the sequence of selectable objects of the predetermined passcode. Access state determination module 58 may transition computing device 2 from the limited access state to the access state when the sequence of designated elements of the candidate passcode matches the sequence of selectable objects of the predetermined passcode (e.g., the elements of the predetermined passcode). When the sequence of designated elements of the candidate passcode does not match the sequence of selectable objects of the predetermined passcode (e.g., the elements of the predetermined passcode), access state determination module 58 may not transition computing device 2 from the limited access state to the access state, thereby effectively denying access to one or more applications executable on one or more processors 62 of computing device 2 and/or information stored at one or more storage devices 64 of computing device 2.

Access state determination module 58 may transition computing device 2 from the access state to the limited access state when access state determination module 58 receives an indication of a user input to cause computing device 2 to transition computing device 2 to the limited access state. For instance, a user may provide an input using one or more of user interface 60 or display 4 to indicate that computing device 2 is to transition to the limited access state. Examples of such user inputs include, but are not limited to, a button press of a hardware button embedded at computing device 2, a button press of a graphical button output at display 4 to lock computing device 2, a user gesture provided at display 4 (e.g., a presence-sensitive display) configured to lock computing device 2, and the like. In some examples, access state determination module 58 may transition computing device 2 from the access state to the limited access state in response to a determination by access state determination module 58 that no user input has been received at computing device 2 for a threshold amount of time (e.g., five minutes, two minutes, one minute and thirty seconds, or other amounts of time).

As such, techniques described herein may reduce or eliminate problems associated with visible traces on presence-sensitive displays that result from user gestures to unlock a computing device. Because the locations of the selectable objects may change between instances when the computing device is in the limited access state, even if a visible trace is produced at the presence-sensitive and/or touch-sensitive display, the visible trace would not provide an unintended user with knowledge indicating how to unlock the computing device. In addition, techniques described herein may enable the computing device to provide haptic feedback to facilitate the user selection of the candidate passcode to transition the computing device to the access state. Such haptic feedback may be beneficial to visually impaired users who may otherwise have trouble designating the passcode to unlock the device. Moreover, the haptic feedback may enable a user to input the passcode to unlock the device when the computing device is physically located in a place where the presence-sensitive display is not easily viewed (e.g., in a user's pocket), possibly providing an added measure of security by preventing unintended users from viewing the passcode when it is entered by the user.

FIG. 3 is a block diagram illustrating an example output for display for configuring a passcode, in accordance with one or more aspects of this disclosure. Passcode initiation module 50 may output graphical user interface (GUI) 81 at display 4 in instances where computing device 2 is in an access state to enable a user to configure the predetermined passcode that authorizes computing device 2 to transition from a limited access state to the access state. As illustrated in FIG. 3, GUI 81 may include passcode element selection area 80, designated element area 90, designated element deletion control

94, cancellation button 96, and confirmation button 98. Passcode initiation module 50 may display selectable objects at passcode element selection area 80 (e.g., selectable objects 82, 84, 86, and 88 in the illustrated example) to enable a user to provide user inputs to cause computing device 2 to select elements of a predetermined passcode. For instance, a user may provide an input, such as a touch gesture at an area of display 4 that displays one of the selectable objects, to cause computing device 2 to designate the selectable object as an element of the predetermined passcode. In response to receiving the indication of the user input received at display 4 to designate the selectable object as the element of the predetermined passcode, passcode initiation module 50 may output for display the designated element at designated element area 90.

Passcode initiation module 50 may continue to receive indications of user inputs to cause computing device 2 to designate elements of the predetermined passcode until a desired number of elements have been designated. Passcode initiation module 50 may determine the passcode as the sequence of designated elements. In the example of FIG. 3, passcode initiation module 50 outputs for display designated elements in arrangement 92 at designated element area 90. Arrangement 92 represents the sequence of designated elements of the predetermined passcode. As illustrated, arrangement 92 representing the predetermined passcode includes five individual elements. However, in some examples the predetermined passcode may include fewer than five elements, or more than five elements. In general, a passcode that includes a greater number of elements may be more secure than a passcode that includes fewer elements. That is, as the number of elements of the predetermined passcode increases, it may be harder for an unintended user to guess the correct sequence and identity the selectable elements that corresponds to the predetermined passcode when the computing device is in the limited access state.

Designated element deletion control 94 may enable a user to remove designated elements from the predetermined passcode. For example, a user may inadvertently select one of the selectable objects to designate the selectable object as an element of the predetermined passcode. In such an example, the user may select designated element deletion control 94, such as by providing a touch gesture at an area of display 4 that displays designated element deletion control 94. In response to receiving an indication of a user input received at display 4 to select designated element deletion control 94, passcode initiation module 50 may remove one or more elements of the predetermined passcode. For instance, passcode initiation module 50 may remove the most recently designated element. In some examples, passcode initiation module 50 may remove more than the most recently designated element. For instance, passcode initiation module 50 may remove the entire predetermined passcode to enable the user to reselect elements to define the entire predetermined passcode.

Cancellation button 96 may enable a user to cancel the passcode initiation. As such, in response to receiving an indication of a user input to select cancellation button 96, passcode initiation module 50 may determine the predetermined passcode as the predetermined passcode that was active prior to passcode initiation module displaying GUI 81. That is, cancellation button 96 may enable a user to cancel the passcode initiation process and return to a previously-defined predetermined passcode.

Confirmation button 98 may enable a user to confirm a predetermined passcode defined during the passcode initiation (e.g., a passcode defined by the sequence of selectable elements corresponding to arrangement 92). In response to receiving an indication of a user input to cause computing device 2 to select confirmation button 98 (e.g., an indication of a touch gesture received at a region of display 4 that displays confirmation button 98), passcode initiation module 50 may determine the predetermined passcode as the sequence of designated elements displayed at designated element area 90 (e.g., arrangement 92).

In some examples, in response to receiving an indication of a user input to select confirmation button 98, passcode initiation module 50 may present a user interface to enable a user to re-select the predetermined passcode before passcode initiation module 50 designates the predetermined passcode as the active predetermined passcode. That is, prior to activating the newly-entered passcode, passcode initiation module 50 may require a user to reselect the newly-entered passcode. In certain examples, prior to activating the newly-entered passcode, passcode initiation module 50 may provide two separate instances of user interfaces to enable the user to reselect the newly-entered passcode.

For example, passcode initiation module 50 may provide a first instance of a user interface that outputs two or more selectable objects corresponding to the predetermined passcode, and may provide a "hint" for the user of the sequence of selectable elements corresponding to the newly-entered passcode. For instance, passcode initiation module 50 may provide the hint by outputting one or more of the elements of the passcode in a sequence corresponding to the sequence of elements representing the newly-entered passcode. If the user does not select the sequence of selectable elements corresponding to the newly-entered passcode, passcode initiation module 50 may cancel the passcode initiation and use a previously-defined passcode as the predetermined passcode. If the user selects the sequence of selectable elements corresponding to the newly-entered passcode, passcode initiation module 50 may present a second instance of a user interface that outputs two or more selectable objects corresponding to the predetermined passcode without providing a hint for the user. If the user does not select the sequence of selectable elements corresponding to the newly-entered passcode, passcode initiation module 50 may cancel the passcode initiation and use a previously-defined passcode as the predetermined passcode. If the user selects the sequence of selectable elements corresponding to the newly-entered passcode, passcode initiation module 50 may determine the active predetermined passcode as the newly-entered passcode. That is, in a subsequent instance where computing device 2 is in a limited access state, access state determination module 58 may use the newly-entered passcode as the predetermined passcode to determine whether computing device 2 transitions from the limited access state to the access state.

FIGS. 4A and 4B are block diagrams illustrating example output for display for transitioning a computing device from a limited access state to an access state, in accordance with one or more aspects of this disclosure. FIG. 4A illustrates an example of the output of display 4 where computing device 2 is in a first instance of a limited access state. FIG. 4B illustrates an example of the output of display 4 where computing device 2 is in a second instance of a limited access state. That is, FIGS. 4A and 4B, taken together, illustrate an example of output of display 4 where computing device 2 is in a first instance of a limited access state (FIG. 4A), then transitions to an access state (not illustrated), then transitions to a second instance of a limited access state (FIG. 4B).

As illustrated in FIG. 4A, element presentation module 52 (of FIG. 2) may cause display 4 to output for display two or more selectable objects in instances where computing device 2 is in a limited access state configured to deny access to one or more applications and/or information stored at one or more storage devices 64. At least one of the two or more selectable objects includes an element of a predetermined passcode that authorizes computing device 2 to transition from the limited access state to an access state. In the example of FIG. 4A, element presentation module 52 causes display 4 to output for display selectable objects 102, 104, 106, and 108 in arrangement 100 at selection area 8 of display 4. While FIG. 4A illustrates an example where element presentation module 52 outputs four selectable objects at selection area 8, the techniques of this disclosure are not so limited. For instance, element presentation module 52 may output fewer than four selectable objects (e.g., three selectable objects, two selectable objects, etc.) or more than four selectable objects (e.g., five selectable objects, six selectable objects, or more selectable objects).

Gesture determination module 54 (of FIG. 2) may receive an indication of a user input received at display 4 to select one of selectable objects 102, 104, 106, or 108. In addition, gesture determination module 54 may receive an indication of a user input received at display 4 to designate the selected object as an element of a candidate passcode (e.g., a motion gesture received at display 4).

In some examples, subsequent to receiving the indication of the user input to cause computing device 2 to designate the selectable object as an element of the candidate passcode, element presentation module 52 may continue to output the selectable object at selection area 8 of display 4. For instance, gesture determination module 54 may receive an indication of an input to cause computing device 2 to designate selectable object 102 as an element of a candidate passcode. In some examples, subsequent to receiving the indication of the input to cause computing device 2 to designate selectable object 102 as an element of the candidate passcode, element presentation module 52 may continue to output selectable object 102 at selection area 8 of display 4.

In certain examples, subsequent to receiving the indication of the user input to cause computing device 2 to designate the selectable object as an element of the candidate passcode, element presentation module 52 may cease to output the selectable object at selection area 8 of display 4. For instance, subsequent to receiving an indication of an input to cause computing device 2 to designate selectable object 102 as an element of a candidate passcode, element presentation module 52 may cease to output selectable object 102 at selection area 8 of display 4. In some examples, in response to receiving an indication of a user input to cause computing device 2 to designate the selectable object as an element of the candidate passcode (e.g., a user input to designate selectable object 102 as the element of the candidate passcode), element presentation module 52 may output a selectable object at selection area 8 that is different than the selectable object that was designated as the element of the candidate passcode.

As an example, a predetermined passcode may include four elements. Element presentation module 52 may output a first group of selectable objects at selection area 8 (e.g., a group of four selectable objects). The first group of selectable objects may include at least one selectable object that is an element of a predetermined passcode. However, the predetermined passcode may include at least one element that does not correspond to a selectable object of the first group. That is, element presentation module 52 may output a first group of selectable objects such that at least one selectable object of the first group of selectable objects is an element of the predetermined passcode, but not every element of the predetermined passcode is represented by a selectable object of the first group.

For instance, in the example of FIG. 4A, the predetermined passcode may include a hexagon-shaped selectable object corresponding to selectable object 102. In addition, in the example of FIG. 4A, the predetermined passcode may include a square-shaped selectable object that does not correspond to any of selectable objects 102, 104, 106, or 108. In such an example, in response to receiving an indication of a user input to cause computing device 2 to designate selectable object 102 as an element of the candidate passcode, element presentation module 52 may cease to output selectable object 102, and may output a selectable object that is different than selectable object 102 (e.g., a square-shaped selectable object that is an element of the predetermined passcode). As such, element presentation module 52 may output a group of selectable objects that includes at least one element of a predetermined passcode, but does not include all of the elements of the predetermined passcode.

Element presentation module 52 may output selectable objects in different arrangement between instances when computing device 2 is in a limited access state. That is, element presentation module 52 may output a group of two or more selectable objects at selection area 8 of display 4 in a first arrangement (e.g., arrangement 100) during a first instance when computing device is in a limited access state. Computing device 2 may transition from the first instance of the limited access state to an access state. For instance, a user may enter a candidate passcode. Access state determination module 58 may transition computing device 2 to the access state based on a determination that the candidate passcode entered by the user matches a predetermined passcode that authorizes computing device 2 to transition to the access state. Then, computing device 2 may transition to a second instance of the limited access state. For instance, access state determination module 58 may transition computing device 2 to the second instance of the limited access state based on a determination that no user input is received for a threshold amount of time (e.g., two minutes) in instances where computing device 2 is in the access state. Element presentation module 52 may output a second group of selectable objects in a second arrangement at selection area 8 in instances where computing device 2 is in the second instance of the limited access state. The second arrangement may be different than the first arrangement. For example, at least one selectable object may be output at display 4 in both the first arrangement and the second arrangement, and may be output at a first location of display 4 in the first arrangement and output at a second, different location of display 4 in the second arrangement.

In certain examples, element presentation module 52 may output selectable regions associated with the selectable objects without causing display 4 to output for display any indication of the locations of the selectable objects on display 4. For instance, element presentation module 52 may output selectable regions associated with selectable objects 102, 104, 106, and 108. The selectable regions may include physically distinct regions of display 4. As an example, the selectable regions may include regions of display 4 corresponding to the regions of display 4 that display selectable objects 102, 104, 106, and 108 in the illustrated example of FIG. 4A. In certain examples, element presentation module 52 may output the selectable regions without causing display 4 to output any indication of the locations of selectable objects 102, 104, 106, and 108 on display 4. For instance, element presentation module 52 may output the selectable regions without causing display 4 to render any graphical content.

In such examples, a user may provide a user input gesture, such as a touch gesture at one of the selectable regions, to cause computing device 2 to select a selectable object corresponding to the selectable region. For instance, a user may provide a touch gesture at a selectable region corresponding to selectable object 102. In response, haptic feedback module 56 may provide a haptic feedback configured to uniquely identify selectable object 102 (e.g., one or more physical vibrations of computing device 2 configured to uniquely identify selectable object 102). As such, computing device 2 may receive an indication of a user input received at display 4 to select one of two or more selectable objects without causing display 4 to display any indication of locations of the two or more selectable objects on display 4.

FIG. 4B illustrates an example of an output for display by display 4 when computing device 2 is in a second instance of a limited access state. That is, FIG. 4B illustrates an example of display 4 subsequent to computing device 2 transitioning from the first instance of the limited access state (illustrated in FIG. 4A) to an access state, then to a second instance of the limited access state. In the example of FIG. 4B, element presentation module 52 outputs selectable objects 110, 108, 112, 102, 104, and 106 in arrangement 114 at selection area 8 of display 4.

As illustrated in FIG. 4B, arrangement 114 is different than arrangement 100 of FIG. 4A. That is, each of selectable objects 102, 104, 106, and 108 are output at display 4 in both arrangement 100 of FIG. 4A and arrangement 114 of FIG. 4B. However, the location at which each of selectable objects 102, 104, 106, and 108 is output at display 4 is different as between arrangement 100 and arrangement 114. In addition, element presentation module 52 may output additional selectable objects between instances of computing device 2 being in a limited access state. For example, as illustrated in FIG. 4B, element presentation module 52 outputs selectable objects 110 and 112 during the second instance when computing device 2 is in the limited access state, but does not output selectable objects 110 and 112 during the first instance when computing device 2 is in the limited access state (as illustrated in FIG. 4A).

In the example illustrated in FIGS. 4A and 4B, selectable objects 102, 104, 106, 108 in arrangement 100 may be considered as a first set of selectable objects. Selectable objects 110, 108, 112, 102, 104, and 106 in arrangement 114 may be considered as a second set of selectable objects. As shown in FIGS. 4A and 4B, the first set of selectable objects and the second set of selectable objects each include at least one object that forms an element of the pre-determined passcode.

For example, assume that object 102 is an element of the passcode. In this case, the first set of selectable objects and the second set of selectable objects each include object 102. Also, arrangement 114 is different than arrangement 100 such that object 102 is displayed at a different location than the location in which object 102 is displayed in arrangement 100.

Figure 5:
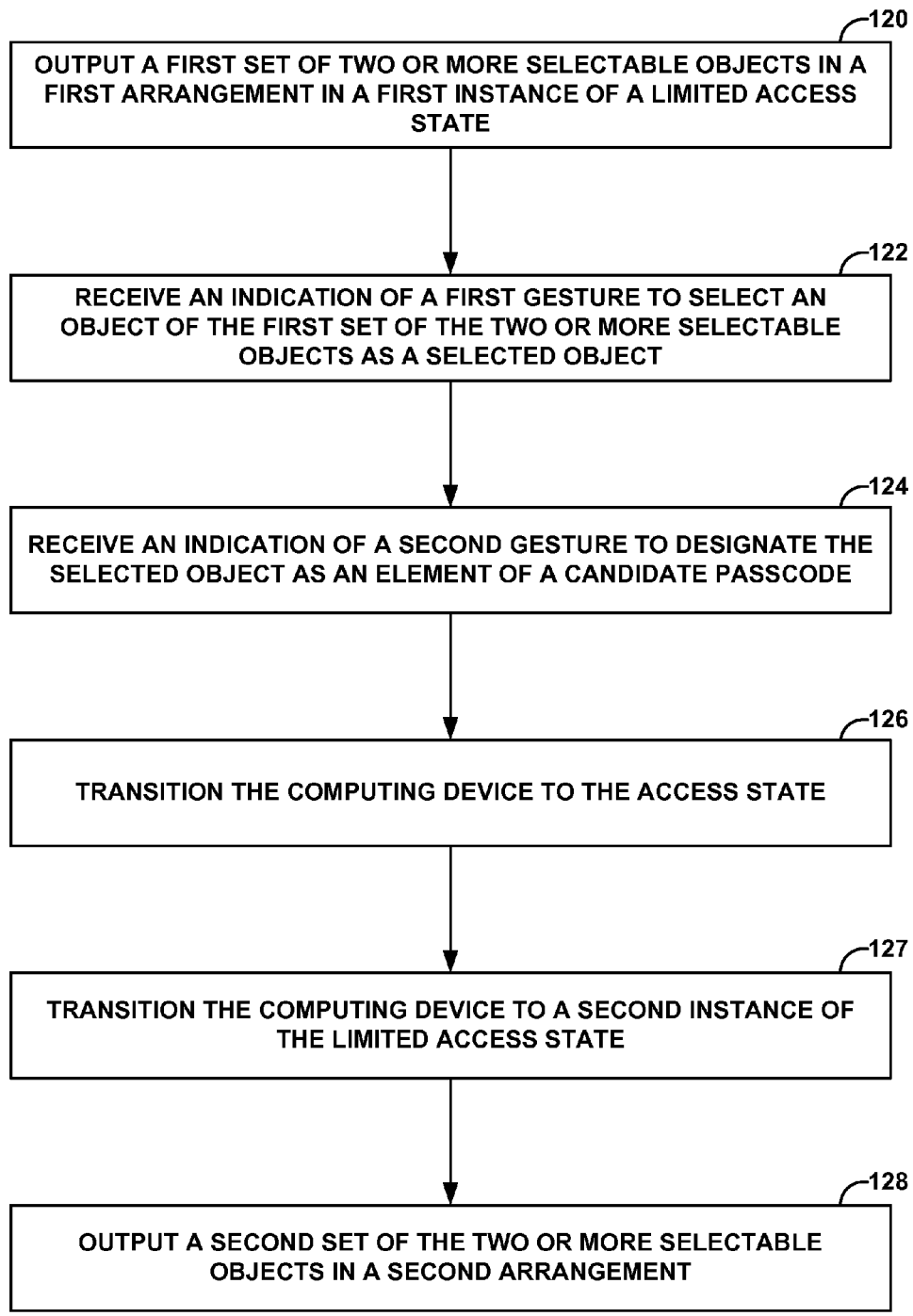
FIG. 5 is a flow chart illustrating an example operation of a computing device, in accordance with one or more aspects of this disclosure.

FIG. 5 is a flow chart illustrating an example operation of a computing device, in accordance with one or more aspects of this disclosure. For purposes of illustration only, the example operation is described below within the context of computing device 2 of FIGS. 1A and 2.

Computing device 2 may output for display at a presence-sensitive display operatively coupled to computing device 2, a first set of two or more selectable objects in a first arrangement of locations including at least a first location of an object of the two or more selectable objects, computing device 2 operating in a first instance of a limited access state (120). For example, computing device 2 may output, at a presence-sensitive display operatively coupled to computing device 2 (e.g., display 4), two or more selectable objects when computing device 2 is in a limited access state configured to deny access to one or more applications stored at computing device 2. In this example, the object of the first set of the two or more selectable objects includes an element from a plurality of elements of a predetermined passcode.

Computing device 2 may receive an indication of a first gesture to select the object from as a selected object (122). For example, computing device 2 may receive an indication of a touch gesture detected at the presence-sensitive display (e.g., display 4) to select one of the two or more selectable objects. In certain examples, in response to receiving the indication of the first gesture to select the object from the first set of the two or more selectable objects, haptic feedback module 56 may cause haptic feedback unit 70 to provide a haptic feedback to indicate that computing device 2 received the first indication. In some examples, the haptic feedback may include at least one physical vibration of computing device. In certain examples, the haptic feedback may be configured to uniquely identify the selected object (e.g., a pattern of one or more vibrations configured to uniquely identify the selected object).

Computing device 2 may receive an indication of a second gesture to designate the selected object as an element of a candidate passcode (124). For example, gesture determination module 54 may receive an indication of a motion gesture detected at the presence-sensitive display (e.g., display 4) to designate the selected object as the element of the candidate passcode. The indication of the motion gesture may include an indication of a motion of an input unit (e.g., a finger, pen, stylus, or other input unit) from a first location of display 4 (e.g., a location of a touch gesture to select the selectable object) to a second location of display 4. In certain examples, the indication of the first gesture to select the selectable object may include an indication of a touch gesture received at a first time at a first location of display 4 that displays the selected object, and the indication of the second gesture may include an indication of a second touch gesture received at a second time at a location of display 4 that is at or near the first location such that the time difference between the first time and the second time is within a threshold amount of time (e.g., a double-tap gesture).

Computing device 2 may transition, based at least in part on a comparison between the candidate passcode and the predetermined passcode, from operating in the first instance of the limited access state to operating in an access state that permits access to the one or more applications executable by the computing device (126). For example, access state determination module 58 may determine that a sequence of elements of the candidate passcode matches a sequence of elements of the predetermined passcode.

Computing device 2 may transition from operating in the access state to operating in a second instance of the limited access state (127). For example, computing device 2 may determine that no user input has been detected by computing device 2 for a threshold amount of time (e.g., one minute). In response to the determination, computing device 2 may transition to operating in a second instance of the limited access state that denies access to data stored at computing device 2 and/or one or more applications executable by computing device 2.

Computing device 2, operating in the second instance of the limited access state, may output for display at the presence-sensitive display (e.g., display 4) a second set of two or more selectable objects in a second arrangement of locations (128). The first set of the two or more selectable objects and the second set of the two or more selectable objects may each include the object. The second arrangement may be different than the first arrangement such that the object is displayed at a second location that is different than the first location of the first arrangement. In certain examples, at least one of the two or more selectable objects of the second set of the two or more selectable objects may include a selectable object that is different than each of the two or more selectable objects of the first set.

In some examples, prior to transitioning the computing device to the access state, and in response to receiving the indication of the second gesture to designate the selected object as the element of the candidate passcode, computing device 2 may cease to output the selected object at the presence-sensitive display, and may output for display at the presence-sensitive display a second selectable object that is different than each of the two or more selectable objects of the first set.

Figure 6:
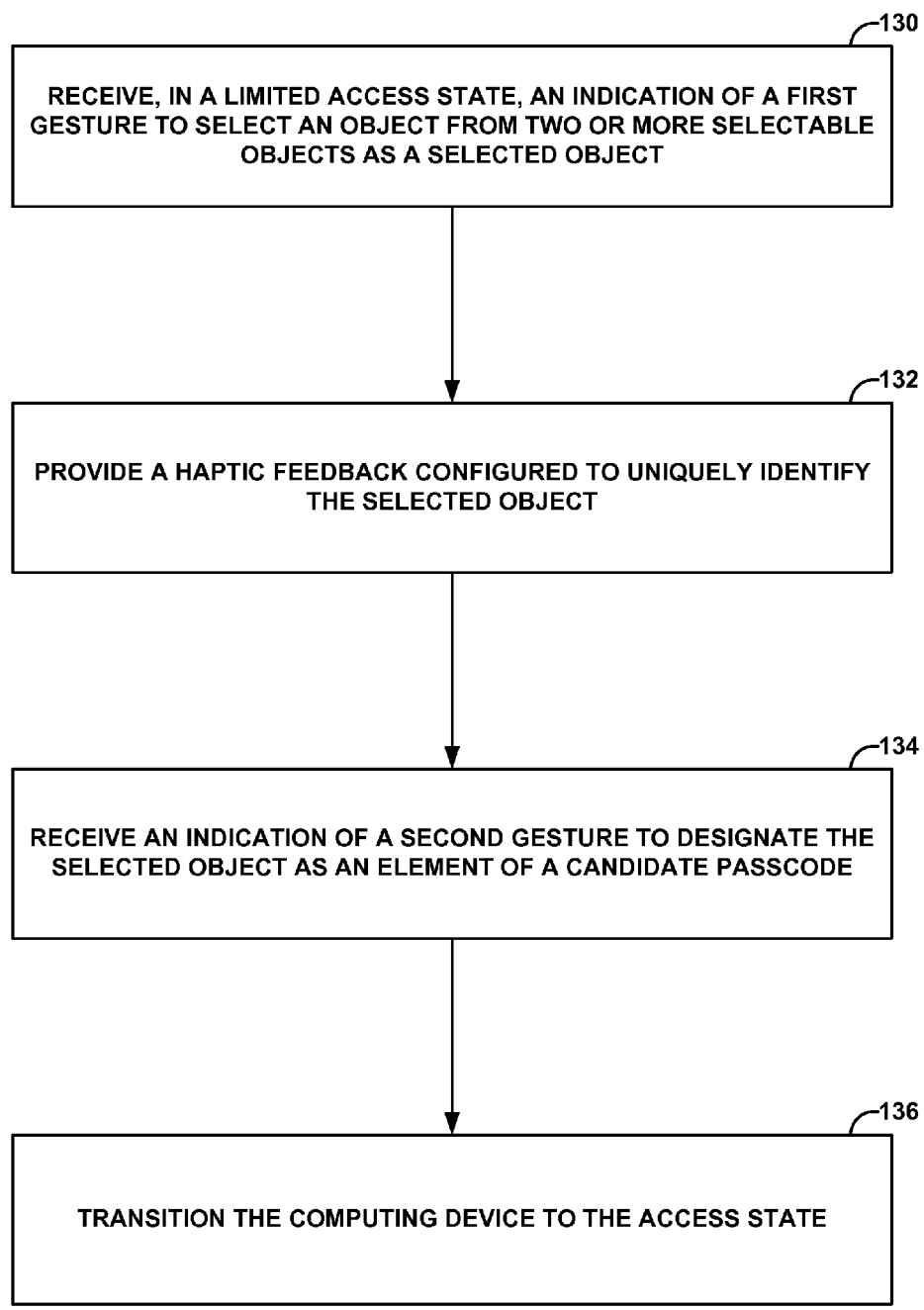
FIG. 6 is a flow chart illustrating an example operation of a computing device, in accordance with one or more aspects of this disclosure.

FIG. 6 is a flow chart illustrating an example operation of a computing device, in accordance with one or more aspects of this disclosure. For purposes of illustration only, the example operation is described below within the context of computing device 2 of FIGS. 1A and 2.

Computing device 2, operating in a limited access state that denies access to one or more applications executable by computing device 2, may receive an indication of a first gesture to select an object from two or more selectable objects as a selected object (130). At least one of the two or more selectable objects may include an element from a plurality of elements of a predetermined passcode. In this example, computing device 2 may not output for display at display 4 any indication of locations of the two or more selectable objects.

As an example, element presentation module 52 may output two or more selectable regions at display 4, each of the two or more selectable regions corresponding to one of the selectable objects. Gesture determination module 54 may receive an indication of a gesture detected at display 4 (e.g., a presence-sensitive and/or touch-sensitive display) to cause computing device 2 to select the selectable object corresponding to the selectable region. For instance, gesture determination module 54 may receive an indication of a touch gesture detected at a portion of display 4 corresponding to the selectable region. In response, gesture determination module 54 may select the selectable object corresponding to the selectable region.

In response to receiving the first indication of the first gesture to cause computing device 2 to select the object from the two or more selectable objects, computing device 2 may provide a haptic feedback configured to uniquely identify the selected object of the two or more selectable objects (132). For example, haptic feedback module 56 may cause haptic feedback unit 70 to provide a haptic feedback (e.g., one or more physical vibrations of computing device 2) configured to uniquely identify the selected object, such as a pattern, timing, or other physical vibrations to uniquely identify the selected object.

Computing device 2 may receive an indication of a second gesture detected at the presence-sensitive display (e.g., display 4) to designate the selected object from the two or more selectable objects as an element of a candidate passcode (134). For example, gesture determination module 54 may receive an indication of a motion gesture received at the presence-sensitive display (e.g., display 4) to designate the selected object as the element of the candidate passcode, such as an indication of a motion of an input unit from a first location of display 4 to a second location of display 4.

Computing device 2 may transition from operating in the limited access state to operating in the access state based at least in part on a comparison between the candidate passcode and the predetermined passcode (136). For example, access state determination module 58 may determine that a sequence of elements of the candidate passcode matches a sequence of elements of the predetermined passcode.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising: outputting, by a computing device, for display, and while operating in a first access state at an initial time, a set of two or more selectable objects in a first random arrangement of locations determined at the initial time, wherein the computing device, while operating in the first access state, denies access to one or more applications executable by the computing device, and wherein at least one of the set of two or more selectable objects corresponds to a respective element of a predetermined passcode; receiving, by the computing device, an indication of a first gesture to designate the at least one of the set of two or more selectable objects of the set as an element of a first candidate passcode; responsive to determining that the first candidate passcode matches the predetermined passcode, transitioning, by the computing device, from operating in the first access state to operating in a second access state, wherein the computing device, while operating in the second access state, permits access to the one or more applications executable by the computing device; outputting, by the computing device, for display, and while operating in the first access state at a subsequent time after the initial time, the set of two or more selectable objects in a second random arrangement of locations determined at the subsequent time, wherein the second random arrangement of locations is different than the first random arrangement of locations; and after outputting the set of two or more selectable objects in the second random arrangement of locations determined at the subsequent time:

receiving, by the computing device, an indication of a second gesture to designate the at least one of the set of two or more selectable objects of the set as an element of a second candidate passcode; and responsive to determining that the second candidate passcode matches the predetermined passcode, transitioning, by the computing device, from operating in the first access state to operating in the second access state.

2. The method of claim 1, wherein the first gesture comprises a combination of two or more gestures that represent the first gesture to designate the at least one of the set of two or more selectable objects as the element of the first candidate passcode.

3. The method of claim 1, further comprising:

subsequent to receiving the indication of the first gesture, determining, by the computing device, that a sequence of designated elements of the first candidate passcode matches a sequence of elements of the predetermined passcode; and responsive to determining that the sequence of designated elements of the first candidate passcode matches the sequence of elements of the predetermined passcode, determining, by the computing device, that the first candidate passcode matches the predetermined passcode.

4. The method of claim 1, wherein receiving the indication of the first gesture comprises receiving an indication of a motion gesture to designate the at least one of the set of two or more selectable objects as the element of the first candidate passcode.

5. The method of claim 1, wherein outputting the set of two or more selectable objects in the first random arrangement of locations comprises outputting, by the computing device, for display, and while operating in the first access state at the initial time, the at least one of the set of two or more selectable objects at a first location of the first random arrangement of locations, the method further comprising:

subsequent to receiving the indication of the first gesture, ceasing to output, by the computing device, the at least one of the set of two or more selectable objects at the first location of the first random arrangement of locations; and outputting, by the computing device, for display, and while operating in the first access state, the at least one of the set of two or more selectable objects at a second location different from the first location and not included in the first random arrangement of locations.

6. The method of claim 1, wherein outputting the set of two or more selectable objects in the first random arrangement of locations comprises outputting, by the computing device, for display at a first region of a presence-sensitive display, and while operating in the first access state, the at least one of the set of two or more selectable objects at a first location of the first region of the presence-sensitive display, and wherein receiving the indication of the first gesture comprises receiving an indication of a motion gesture that spans the first location of the first region of the presence-sensitive display and a second location of a second region of the presence-sensitive display, wherein the second region of the presence-sensitive display is different from the first region.

7. The method of claim 6, wherein the first region corresponds to a selection area of the presence-sensitive display that displays the set of two or more selectable objects and the second region corresponds to an unlock area of the presence-sensitive display that displays each designated object of the set of two or more selectable objects.

8. The method of claim 1, wherein each of the set of two or more selectable objects comprises one of a circular, square, triangular, or cross-shaped selectable object.

9. The method of claim 1, wherein each of the set of two or more selectable objects does not include alphanumeric characters.

10. The method of claim 1, wherein the first gesture traces a first group of locations of presence-sensitive screen that is different from a second group of locations of presence-sensitive screen that are traced by the second gesture.

11. A non-transitory computer-readable storage medium encoded with instructions that, when executed, cause at least one processor of a computing device to:

output, for display, and while the computing device operates in a first access state at an initial time, a set of two or more selectable objects in a first random arrangement of locations determined at the initial time, wherein the computing device, while operating in the first access state, denies access to one or more applications executable by the computing device, and wherein at least one of the set of two or more selectable objects corresponds to a respective element of a predetermined passcode;

receive an indication of a first gesture to designate the at least one of the set of two or more selectable objects as an element of a first candidate passcode;

responsive to determining that the first candidate passcode matches the predetermined passcode, transition from operating in the first access state to operating in a second access state, wherein the computing device, while operating in the second access state, permits access to the one or more applications executable by the computing device;

output, for display, and while the computing device operates in the first access state at a subsequent time after the initial time, the set of two or more selectable objects in a second random arrangement of locations determined at the subsequent time, wherein the second random arrangement of locations is different than the first random arrangement of locations; and after outputting the set of two or more selectable objects in the second random arrangement of locations determined at the subsequent time:

receive an indication of a second gesture to designate the at least one of the set of two or more selectable objects of the set as the element of a second candidate passcode; and responsive to determining that the second candidate passcode matches the predetermined passcode, transition from operating in the first access state to operating in the second access state.

12. The non-transitory computer-readable storage medium of claim 11, wherein the first gesture comprises a combination of two or more gestures that represent the first gesture to designate the at least one of the set of two or more selectable objects as the element of the first candidate passcode.

13. The non-transitory computer-readable storage medium of claim 11 being further encoded with instructions that, when executed, further cause the at least one processor of the computing device to:

subsequent to receiving the indication of the first gesture, determine that a sequence of designated elements of the first candidate passcode matches a sequence of elements of the predetermined passcode; and responsive to determining that the sequence of designated elements of the first candidate passcode matches the sequence of elements of the predetermined passcode, determine that the first candidate passcode matches the predetermined passcode.

14. The non-transitory computer-readable storage medium of claim 11 being further encoded with instructions that, when executed, further cause the at least one processor of the computing device to receive the indication of the first gesture by at least receiving an indication of a motion gesture to designate the at least one of the set of two or more selectable objects as the element of the first candidate passcode.

15. A computing device comprising:

at least one processor that is a hardware unit configured to:

output, for display at a presence-sensitive display, and while the computing device operates in a first access state at an initial time, a set of two or more selectable objects in a first random arrangement of locations of the presence-sensitive display determined at the initial time, wherein the presence-sensitive display is operatively coupled to the device, wherein the computing device, while operating in the first access state, denies access to one or more applications executable by the computing device, and wherein at least one of the set of two or more selectable objects corresponds to a respective element of a predetermined passcode;

receive an indication of a first gesture detected at the presence-sensitive display to designate the at least one of the set of two or more selectable objects as an element of a first candidate passcode;

responsive to determining that the first candidate passcode matches the predetermined passcode, transition from operating in the first access state, to operating in a second access state, wherein the computing device, while operating in the second access state, permits access to the one or more applications executable by the computing device;

output, for display, and while operating in the first access state at a subsequent time after the initial time, the set of two or more selectable objects in a second random arrangement of locations determined at the subsequent time, wherein the second random arrangement of locations is different than the first random arrangement of locations;

after outputting the set of two or more selectable objects in the second random arrangement of locations determined at the subsequent time:

receive an indication of a second gesture to designate the at least one of the set of two or more selectable objects of the set as the element of a second candidate passcode; and responsive to determining that the second candidate passcode matches the predetermined passcode, transition from operating in the first access state to operating in the second access state.

16. The computing device of claim 15, wherein the first gesture comprises a combination of two or more gestures that represent the first gesture to designate the at least one of the set of two or more selectable objects as the element of the first candidate passcode.

17. The computing device of claim 15, wherein the at least one processor is further configured to:

subsequent to receiving the indication of the first gesture, determine that a sequence of designated elements of the first candidate passcode matches a sequence of elements of the predetermined passcode; and responsive to determining that the sequence of designated elements of the first candidate passcode matches the sequence of elements of the predetermined passcode, determine that the first candidate passcode matches the predetermined passcode.

18. The computing device of claim 15, wherein the at least one processor is further configured to receive the indication of the first gesture by at least receiving an indication of a motion gesture detected at the presence-sensitive display to designate the at least one of the set of two or more selectable objects as the element of the first candidate passcode.

* * * * *